United States Patent [19]
Hales et al.

[11] Patent Number: 6,112,126
[45] Date of Patent: Aug. 29, 2000

[54] ADAPTIVE OBJECT-ORIENTED OPTIMIZATION SOFTWARE SYSTEM

[75] Inventors: Lynn B. Hales, Salt Lake City; Randy A. Ynchausti, Centerville; Donald G. Foot, Jr., Fruit Heights, all of Utah

[73] Assignee: Baker Hughes Incorporated, Houston, Tex.

[21] Appl. No.: 09/027,339

[22] Filed: Feb. 20, 1998

Related U.S. Application Data

[60] Provisional application No. 60/337,355, Feb. 21, 1997, and provisional application No. 60/061,285, Oct. 7, 1997.

[51] Int. Cl.[7] .................................................. G05B 12/02
[52] U.S. Cl. .............................. 700/29; 700/28; 700/30; 700/49; 700/83; 700/86
[58] Field of Search .................................. 700/29, 28, 30, 700/31, 32, 49; 395/500.23, 702, 704, 710; 703/2; 717/2, 4, 10

[56] References Cited

U.S. PATENT DOCUMENTS

| | | | |
|---|---|---|---|
| 4,740,886 | 4/1988 | Tanifuji et al. | 361/150 |
| 4,752,890 | 6/1988 | Natarajan et al. | 700/49 |
| 4,754,410 | 6/1988 | Leech et al. | 364/151 |
| 4,901,221 | 2/1990 | Kodosky et al. | 366/200 |
| 4,910,660 | 3/1990 | Li | 364/148 |
| 5,006,992 | 4/1991 | Skeirik | 364/513 |
| 5,168,441 | 12/1992 | Onarheim et al. | 364/146 |
| 5,291,587 | 3/1994 | Kodosky et al. | 395/100 |
| 5,293,585 | 3/1994 | Morita | 395/52 |
| 5,371,895 | 12/1994 | Bristol | 395/800 |
| 5,428,525 | 6/1995 | Cappelaere et al. | 700/49 |
| 5,454,933 | 10/1995 | Wright et al. | 364/479.23 |
| 5,463,769 | 10/1995 | Tate et al. | 395/700 |
| 5,467,265 | 11/1995 | Yamada et al. | 700/49 |
| 5,485,615 | 1/1996 | Wennmyr | 395/700 |
| 5,485,620 | 1/1996 | Sandre et al. | 395/700 |
| 5,497,315 | 3/1996 | Sugiura et al. | 364/140 |
| 5,631,957 | 5/1997 | Greiss et al. | 379/406 |
| 5,734,337 | 3/1998 | Kupersmit | 340/937 |
| 5,809,282 | 9/1998 | Cooper et al. | 700/49 |
| 5,841,652 | 11/1998 | Sanchez | 700/44 |
| 5,874,955 | 2/1999 | Rogowitz | 345/339 |
| 5,886,895 | 3/1999 | Kita et al. | 700/29 |
| 5,943,062 | 8/1999 | Schanel | 345/440 |

OTHER PUBLICATIONS

Byte Articles Bytemarks Facts Hotbytes VPR Talk: Dec. 1995 IF AI RAN ZOO: USA.
Scalable Discovery of Informative Structural Concepts Using Domain Knowledge Author: Diane J. Cook, Lawrence B. Holder, Surnuani Djoko: Oct. 1996; USA.
Author: B. King: Date Oct. 1993; Expert System in Manufacturing Europe.
Author: John H. Holland "Genetic Algorithms" Jul. 1992; p. 7; USA.
Authors: Kevin M. Passino and Umit Ozguner "Intelligent Control: From the Theory to Application" Date: 1995; USA.
Author: Oak Ridge Centers for Manufacturing Technology "Neural Net Monitors and Controls" USA.

*Primary Examiner*—Paul P. Gordon
*Assistant Examiner*—Ramesh Patel

[57] ABSTRACT

The present invention relates to process control optimization systems which utilize an adaptive optimization software system comprising goal seeking intelligent software objects; the goal seeking intelligent software objects further comprise internal software objects which include expert system objects, adaptive models objects, optimizer objects, predictor objects, sensor objects, and communication translation objects. The goal seeking intelligent software objects can be arranged in a hierarchical relationship whereby the goal seeking behavior of each intelligent software object can be modified by goal seeking intelligent software objects higher in the hierarchical structure. The goal seeking intelligent software objects can also be arranged in a relationship which representationally corresponds to the controlled process' flow of materials or data.

21 Claims, 27 Drawing Sheets

ADAPTIVE OBJECT-ORIENTED OPTIMIZATION SOFTWARE SYSTEM

The present invention claims priority for United State of America Patent Provisional application 60/337,355, filed on Feb. 21, 1997, for "Adaptive Object-Oriented Optimization Software System", and United States of America Patent Provisional application 60/661,285, filed on Oct. 7, 1997, for "Adaptive Object-Oriented Optimization Software System."

BACKGROUND OF THE INVENTION

1. Technical Field

The present invention relates in general to process control systems. In particular, the present invention relates to process control optimization systems which utilize an adaptive optimization software system. In yet further particularity, the present invention relates to adaptive optimization software systems which comprise intelligent software objects (hereinafter sometimes "ISO" or "ISOs") arranged in a hierarchical relationship whereby the goal seeking behavior of each ISO can be modified by ISOs higher in the ISO's hierarchical structure. In yet further particularity, the present invention relates to ISOs comprising internal software objects including expert system objects, adaptive models objects, optimizer objects, predictor objects, sensor objects, and communication translation objects. In yet further and final point of particularity, the present invention also relates to a method of human interaction with said adaptive optimization software system.

2. Background Art

Process control systems are used in a variety of applications to sense process conditions and adjust process operating parameters in an attempt to optimize performance for given sets of goals. Many current conventional process control systems use static representations of the process to be controlled and do not provide for changes in the process control model being used in real time.

In conventional adaptive control theory, a suitable controller structure is chosen and the parameters of the controller are adjusted using static rules so that the output of the process follows the output of the reference of the model asymptotically. Static rules do not permit a process control system to automatically and optimally adapt to changing process conditions.

One significant deficiency of prior art process control systems, whether or not adaptive, is their lack of an intuitive user interface, either for initially configuring a system or for interacting with the system in real-time.

Another significant deficiency of prior art process control systems, whether or not adaptive, is the inability of the process control system to automatically perform control actions and, in so doing, provide a global goal-seeking mechanism that ties the process control system together into a powerful unified system to achieve the highest optimization congruent with management objectives and goals.

Further, many process control systems in the prior art provide for limited levels of control point, component, and/or system modeling or control hierarchies.

Accordingly, many prior art process control systems, whether or not adaptive, cannot provide concurrent multi-level optimization ranging from specific, component-oriented, narrowly focused levels to the broadest, global level.

Traditional process control systems are built up of discrete components (i.e., sensors, controllers) that work independently and lack low-level optimization. Some systems optimize on a global, system level without regard to optimization at each component level, while still other systems optimize only at the component level. As no global goal-seeking mechanism ties the parts together into a powerful unified system to achieve management objectives, the overall process fails to achieve its highest optimization and integration of low-level or component level optimization with the higher level or system level optimization.

Many systems that do provide some amount of concurrent multi-level optimization rely on just one or two methods of achieving the desired concurrent multi-level optimization, rather than on a multiplicity and variety of methods including expert systems, adaptive models which can use one or more modeling methodologies including neural networks, and other predictive modeling techniques.

Among the limited numbers of systems that use a variety of methods, no process control system uses interacting, differing adaptive methods to dynamically change its chosen predictive models in real-time without having to stop either the process being controlled or the process control system.

Moreover, many current conventional process control systems rely upon human operators to determine and implement optimum set points throughout the domain of the process control system in real-time. These process control systems require human intervention to optimize processes and systems, but because human operators vary greatly as to experience and the soundness of their control reasoning, this human factor introduces a wide-ranging variable in the overall effectiveness of the process control system.

Expert systems have provided a significant improvement over traditional process control systems that do not use expert systems. However, many current art process control systems do not use expert systems to assist in adaptation of process control algorithm operation, algorithm selection, or algorithm parameter estimation.

Further, once installed, current art process control systems that do use expert systems lack automatic, systematic approaches to adaptively optimizing its expert system and the expert system's algorithms.

Neural networks are a powerful modeling technique used to assure that the process model accurately predicts the performance of the modeled process over time. However, neural networks have a well known problem of "memorizing" and thereby becoming "static" and unable to find mutated, differing models to more accurately predict process performance over time.

Further, neural networks by definition depend on the user's omniscience to function correctly, and as user omniscience cannot be guaranteed, neural networks based systems suffer from reliance on user omniscience.

Moreover, some neural networks require weights used for the neural network's evaluation to be derived from both the constraints to be implemented and from any data functions necessary for solution; these may not be available as inputs to the network, thus limiting the neural networks' applicability to the process control system due to the inability to learn how to calculate these weights in real-time.

3. Disclosure of Invention

It is therefore an objective of the instant invention to provide a process control optimization system that uses dynamic representations of the process to be controlled, thus providing for changes in the process control model being used in real time.

It is a further objective of the instant invention to provide a process control optimization system that automatically and optimally adapts to changing process conditions.

It is a further objective of the instant invention to provide a process control optimization system having an intuitive user interface for both initially configuring a system and for interacting with the system in real-time.

It is a further objective of the instant invention to provide a process control optimization system having a global goal-seeking mechanism that ties a process control system together into a powerful unified system that achieves the highest optimization congruent with management objectives and goals.

It is a further objective of the instant invention to provide a process control optimization system having virtually unlimited levels of modeling and control hierarchy as well as virtually unlimited numbers of component-level process control points.

It is a further objective of the instant invention to provide a process control optimization system having concurrent multi-level optimization ranging from specific, component-oriented, narrowly focused levels to the broadest, global level.

It is a further objective of the instant invention to provide a process control optimization system that achieves the highest optimization and integration of low-level or component level optimization together with higher level or system level optimization.

It is a further objective of the instant invention to provide a process control optimization system having said concurrent multi-level optimization using a variety of methods including expert systems, adaptive models which can use one or more modeling methodologies including neural networks, and other predictive modeling techniques.

If is a further objective of the instant invention to allow a process control optimization system to use one or more interacting, differing adaptive methods to dynamically change its chosen predictive models in real-time without having to stop either the process being controlled or the process control system.

It is a further objective of the instant invention to provide a process control optimization system that optimizes processes and systems consistent with management objectives without the need for continuing human intervention.

It is a further objective of the instant invention to provide a process control optimization system that use expert systems to assist in adaptation of algorithm operation, algorithm selection, and algorithm parameter estimation It is a further objective of the instant invention to provide a process control optimization system that automatically, systematically approaches adaptively optimizing its expert system and the expert system's algorithms.

It is a further objective of the instant invention to provide a process control optimization system that adaptively uses neural networks to prevent memorization by the neural networks.

It is a yet further and final objective of the instant invention to provide a process control optimization system that does not depend on a user's omniscience to function correctly.

As more fully described herein below, the present invention provides a process control optimization system that achieves, in substantial measure, these above stated objectives by including intelligent software objects (hereinafter referred to as an ISO or ISOs); an adaptive optimization software system comprising ISOs; a method of initializing said adaptive optimization software system; and a method of human interaction with said adaptive optimization software system.

BRIEF DESCRIPTION OF THE DRAWINGS

Referring now to the drawings wherein like elements are numbered alike in the several FIGURES.

BEST MODE FOR CARRYING OUT THE INVENTION

Adaptive process control systems use computer-based models of the process to be controlled to aid in controlling that process even in the presence of parametric or structural uncertainty in the models used to represent the process. Adaptive process control systems change their models to adapt to current process conditions and optimize a process' performance given a set of goals and objectives. In conventional adaptive control theory, a suitable controller structure is chosen and the parameters of the controller are adjusted using adaptive rules so that the output of the process follows the output of the reference of the model asymptotically.

Figure 1:
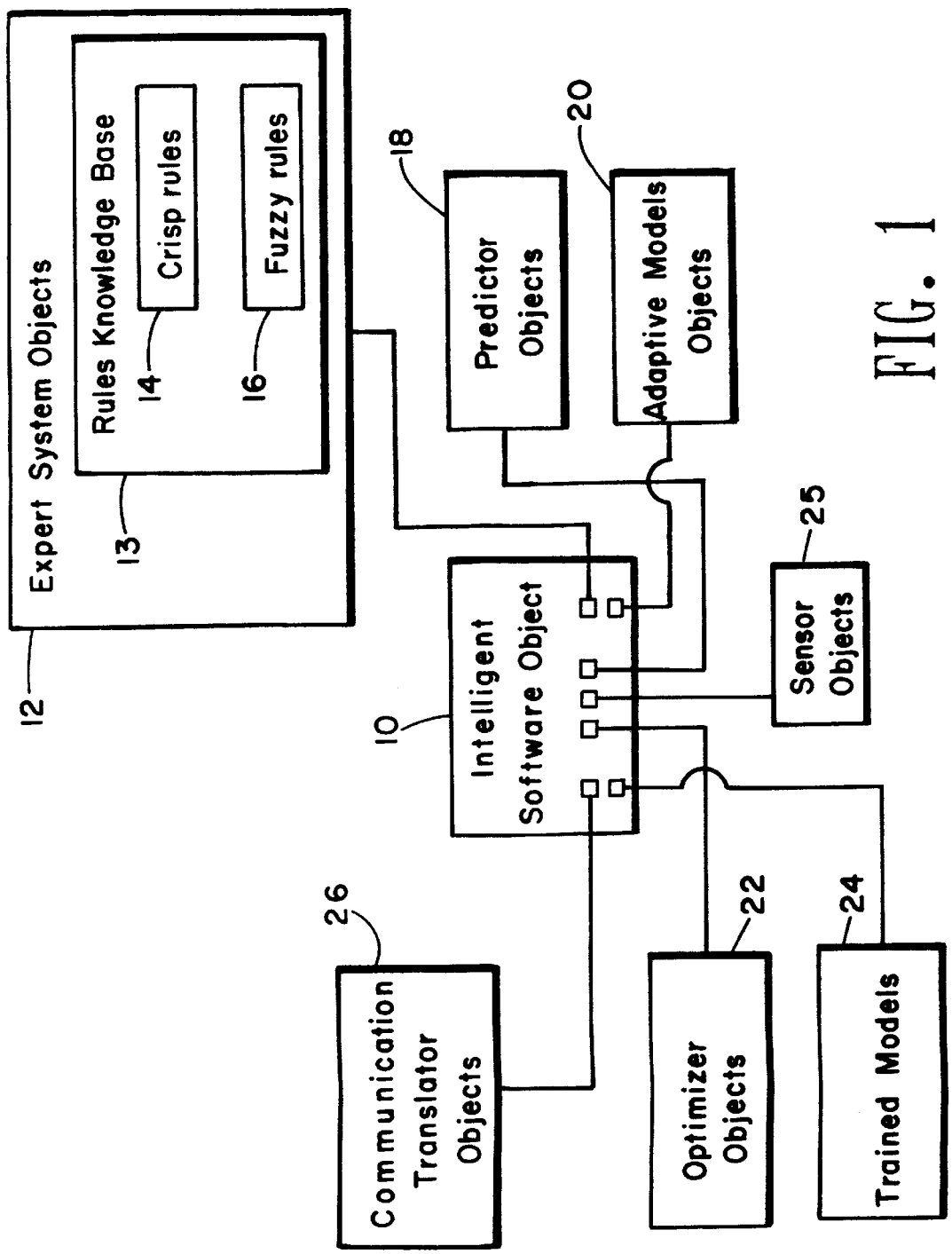
FIG. 1 is a block diagram of the internal software objects included in an ISO in accordance with the present invention.

Referring generally to FIG. 1, the instant invention's adaptive optimization software system is comprised of intelligent software objects, or ISOs 10, which provide a variety of functions useful in control and/or optimization applications and which can be connected or grouped together in a variety of ways. ISOs 10 comprise internal software objects; in the preferred embodiment, the present invention uses a software programming methodology known as object-oriented programming, typically implemented using a computer language such as SmallTalk™ or C++, to implement the ISO's 10 internal software objects, thus creating an adaptive, object-oriented optimization software system. It is understood and within the contemplation of the applicants that the software objects, both internal software objects and other software objects, can, but need not, be limited to "object-oriented" software objects. The instant invention's adaptive optimization software system performs its control functions by having one or more ISOs 10 configured to cooperatively represent the process to be controlled; optimization is also achieved through the cooperation between an ISO's 10 internal software objects as well as between ISOs 10 configured and acting as a system.

The instant invention's ISOs 10 are capable of configurably maintaining a record of events associated with the process, concrete components, and/or abstract components represented by those ISOs 10. Each ISO 10 is configured with sensor objects 25, described more fully herein below, acting as data managers of the state(s) of the controlled process, including the state(s) of the control variables for the process. Using these sensor objects 25, ISO's 10 expert system objects 12, predictor objects 18, adaptive models objects 20, and optimizer objects 22 work together to find, calculate, interpret, and derive new states for the control variables that result in the desired process state(s) or achieve the process goal(s).

In addition to real-world processes, concrete components, and/or abstract components, the instant invention's adaptive optimization software system is designed to monitor its own performance and adaptively modify its own initial configuration to improve performance according to its initial optimizing objectives, its current optimizing objectives, and objectives specified by system users.

Referring to FIG. 1, a block diagram of an exemplary ISO is generally shown at 10. ISO's 10 internal software objects allow each ISO 10 to represent almost anything imaginable. The attributes of an exemplary ISO 10 are first described in general, followed by descriptions of exemplary organization of specific ISOs 10.

ISO 10 is the basic building block component of the present invention's adaptive optimization software system. Each ISO 10 can represent and model physical things, abstract things, or conceptual things, and initially comprises a plurality of internal software objects, more fully described herein below, which can be enabled, disabled, or not configured at all. ISO's 10 internal software objects include: expert system objects 12 capable of utilizing one or more rules knowledge bases 13 containing crisp logic rules 14 and/or fuzzy logic rules 16; adaptive models objects 20 which can use multiple, concurrent, differing modeling methodologies to produce adaptive models which "compete" in real time with each other adaptive model within ISO 10 to predict a real-time process outcome based on current, past, and predicted process parameters; predictor objects 18 which select from the adaptive models objects' 20 competing adaptive models that adaptive model which bests predicts the measured real-time process outcome; optimizer objects 22 which decide optimum parameters to be used by an ISO 10 for a given state of the process, calculation, or component to be optimized; communication translator objects 26 which can handle communications between an ISO 10 and anything outside ISO 10; and sensor objects 25 which, in part, act as intelligent data storage and retrieval warehouses.

Although internal software objects' functionality are present in an ISO 10, enabling of these functionalities is configurably left to a user or, optionally, to ISO 10 itself through its expert system objects 12. The instant invention's adaptive, object-oriented optimization software's user interface, more fully described herein below, initially presents a user with an initial set of ISO 10 internal software objects; users then configure specific ISOs 10 or groups of ISOs 10 from this initial set of possible internal software objects to represent, model, and relate ISO 10 to processes, concrete components (e.g., an automobile) or abstract components (e.g., a miles per gallon calculation) to represent real life or abstract processes such as plants, procedures, ideas, or systems. Mechanical devices, electrical devices, controllable processes, abstract calculations, or almost anything to be controlled or optimized can be represented by ISO 10.

As do many process control systems in the current art, ISO 10 employs computer based expert systems 12, specialized control programs that use inference engines and programmed rules to approximate the actions of an expert human operator in calculating and implementing a set of steps including setting optimum set points. In the preferred embodiment, only one expert system object 12 is present. Expert system objects 12 can utilize one or more rules knowledge bases 13. Expert system objects 12 provide an intelligent scripting environment for influencing ISO's 10 behavior within the instant invention's adaptive optimization software system, as well as for achieving and actuating ISO's 10 modeling, predicting, optimizing, and controlling. Further, expert system objects 12 provide a scripting environment for sensor objects' 25 intelligent retention of data ISO 10 encounters or generates over time. Expert system objects 12 can "remember" by storing data regarding their own operation. These data may be accessible to other internal software objects in the same ISO 10 as the expert system objects 12 or to other ISOs 10, but may not be directly accessible by the user.

As those skilled in the art will understand, an expert system's rules, either fuzzy or crisp, reflect components of human experts' knowledge, text book relationships, process models, and local plant knowledge. As further shown in FIG. 1, expert system objects' 12 rules knowledge bases 13 can use either crisp rules 14, fuzzy rules 16, or both to define knowledge of itself and its state variables, define knowledge regarding the interaction of an ISO's 10 internal software objects within ISO 10, define knowledge regarding interaction with other ISOs 10, and define meta-knowledge of itself and how it is to become "alive" within the computing environment and within the adaptive optimization software system. Expert system objects 12 also provide the ability to make choices, given a full set of past, present and predicted values of itself (e.g., its state), and act according to the choices made to affect ISO's 10 behavior. Expert system objects' 12 rules knowledge bases 13 comprise linguistic, mathematical, and/or symbolic rules, described in either crisp or fuzzy terms, which are user configurable and can include business rules (e.g., if cost_per_unit>4 then use_cheaper_material) as well as more familiar control rules (e.g., if condition=overflow then turn_on_valve). Further, fuzzy terms embody both the use of fuzzy syntax and fuzzy logic constructs such as fuzzy logic membership functions and fuzzy sets.

The key to incorporating a process model in an adaptive optimization software system is to assure that the process model accurately predicts the performance of the modeled process over time. A key feature of each ISO 10 is the inclusion of functionality without limiting the methodology for accomplishing or providing that functionality. Adaptive models objects 20 can use a number of concurrent, adaptive modeling methodologies to provide desired flexibility, including empirical models, phenomenological models, first principles models, system identification models, neural networks, linear regression, and other modeling methodologies. The ability of adaptive models objects 20 to concurrently use one or more differing modeling methodologies is an advantage of the instant invention. Because adaptive models objects 20 can use differing model methodologies, the actual methodology or the methodology parameters may adaptively and automatically change over time so that the methodology more accurately and effectively adapts to its designed task.

In the preferred embodiment, adaptive models objects 20 use neural networks as their preferred methodology. Adaptive models objects' 20 neural networks "learn" to make decisions through the neural network's ability to adjust the weights and/or the connective organization of the neural network from data experienced, thereby producing "trained" models. Adaptive models objects 20 train or learn using a training process that corresponds to the methodology of that adaptive models object 20; differing adaptive model methodologies have differing training processes. However, in general, an adaptive models object 20 uses the inputs of each entry in a set of the training data associated with the adaptive models object 20 to simulate, calculate or predict the corresponding outputs to that entry in the training data set. Adaptive models objects 20 use the training process to update the model parameters to minimize the difference between the outputs that the adaptive models object 20 generated and the recorded outputs. After the appropriate training has occurred, adaptive models object 20 validates the adaptive model so generated using a set of test data. The adaptive models object 20 simulates, calculates, or predicts the output for each entry in the test data set, and uses the difference or error between the outputs that the adaptive model generated and the entry in the test data set to determine the ability of the adaptive model to accurately simulate or predict the process.

Adaptive models objects 20 can "remember" by storing data, including trained adaptive models, regarding their own operation. These data may be accessible to other internal software objects in the same ISO 10 as the adaptive models objects 20 or to other ISOs 10, but may not be directly accessible by the user.

Each ISO 10 has input state variables, which are the data presented to the adaptive model(s) to initialize the model(s); output state variables, which are the data produced by the adaptive model(s); and control state variables, which are data associated with goals and objectives. Each ISO 10 includes the ability to predict its future state, given current conditions and a statement of desired future conditions, through one or more predictor objects 18 and one or more adaptive models objects 20 associated with predictor object (s) 18 that know the relationships between input or control state variables and output state variables Using its differing methodologies, adaptive models objects 20 produce a variety of differing, "competing" adaptive models which try to accomplish a specific task in the best way possible; predictor objects 18 associated with adaptive models objects 20 then selects the individual adaptive model that best fits the actual data for a given sampling delta. A sampling delta can be time, as in the preferred embodiment, but can be any delta such as changes in mass, volume, color, flow rate, sound, or dollars. Predictor objects 18 and adaptive models objects 20 have the ability to "learn" how to model the processes they represent by interrogating sensor objects 25, as well as other ISOs 10 and their sensor objects 25, for data required by the training methodologies used by predictor objects 18 and adaptive models objects 20. Predictor objects 20 can "remember" by storing data regarding their own operation. These data may be accessible to other internal software objects in the same ISO 10 as the predictor objects 20 or to other ISOs 10, but may not be directly accessible by the user.

Although individual adaptive models compete with each other, ISOs 10 cooperate with ISOs 10 of the same or differing hierarchical levels by teaching the other ISOs 10, i.e. providing the other ISOs 10 with trained models 24, thereby allowing a given ISO 10 to use another ISO's 10 trained models 24 and cooperating to accomplish the adaptive, object-oriented software system's goals and functionality.

Optimizing process control systems must take optimizing control actions in a manner that is consistent with management objectives. In the instant invention, optimizer objects 22 use predictor objects' 18 selected adaptive model(s) which best model the process associated with that optimizer object 22, given the current state(s) of the ISO's 10 inputs, to determine optimal values to use to achieve desired ISO 10 future state conditions, e.g. control set points. state conditions, e.g. control set points. Optimizer objects 22 can use a number of optimization methodologies; in the preferred embodiment, optimizer objects 22 use genetic algorithms to provide their adaptation ability.

Optimizer objects 22 can also influence other ISO 10 internal software objects. For example, optimizer objects 22 can influence expert system objects 12 by modifying expert system objects' 12 rules, fuzzy logic membership functions, or fuzzy sets, or can influence an adaptive models object 20 by modifying the adaptive modeling methodology to be used. Optimizer objects 22 can "remember" by storing data regarding their own operation. These data may be accessible to other internal software objects in the same ISO 10 as the optimizer objects 22 or to other ISOs 10, but may not be directly accessible by the user.

ISOs 10 can also contain any number of sensor objects 25 to collect, store, and manage input and output state(s) for ISO 10. Sensor objects 25 act as data storage and retrieval moderators capable of providing ISO 10 and its internal software objects with data reflecting the current state of an ISO 10 or real-world device; more abstract, calculated data such as current cost per unit; and, configurably by either a user or ISO 10 itself, with historical data. Each sensor object 25 can include built-in state variables, including state variables that represent the world outside ISO's 10 software representation of itself (i.e., real-world sensor values), state variables that are determined by itself (i.e., algorithmically), and state variables that are given it by other ISOs 10. Economic state variables are an important ability of each ISO 10. An economic state variable is a new state that is based on a calculated value, e.g. "per unit", or cost of another state variable. Sensor objects 25 also maintain historical and statistical knowledge of ISO's 10 own state variables, including ISO's 10 built-in representation and knowledge of its values and costs.

As moderators, sensor objects 25 can filter, compute, and statistically manipulate data as well as store data and provide stored data for ISO's 10 use. ISO 10 maintains one sensor object 25 for each of its state variables, including one for each instrument or actuator for which ISO 10 has responsibility. Sensor objects 25 can include "input" sensors which relate to and manage data received as input by ISO 10, and "output" sensors, which relate to and manage data output by or within ISO 10; using communication translator objects 26, data in sensor objects 25 can be related to real-world devices such as instruments or actuators, thereby creating the link between ISO 10 and the world. Sensor objects 25 can store and moderate data as a single value, e.g. "1", or as a set or range of values, e.g. a variable, color, comprising a set of red, blue, and green values. Sensor objects 25 are also ISO's 10 main internal software object that allows user interface with an ISO's 10 data.

Additionally, sensor objects 25 store an ISO's 10 adaptive model predictions, adaptive model parameters, and/or adaptive model states for use within ISO 10. ISO 10 also maintains the outputs or results from all predictor objects 18 and optimizer objects 22 as ISO 10 states. Expert system objects 12 can integrate and use sensor objects' 25 data in accomplishing the goals described by the rules contained within the expert system objects 12. Although a sensor objects' 25 data is normally integer, floating point, string, symbol, logical, or an array of any of these, sensor objects 25 can store an entire ISO 10, any of an ISO's 10 internal software objects, or a list of ISOs 10 or their internal software objects.

As further shown in FIG. 1, each ISO 10 further comprises communication translator objects 26. Communication translator objects 26 are capable of synchronously or asynchronously communicating between an ISO 10 and a given real-world process or component to be monitored and controlled in real-time, between an ISO 10 and a source of abstract data (e.g. a calculated or simulated data source), and/or between an ISO 10 and other ISOs 10. Accordingly, communication translator objects 26 are capable of synchronous or asynchronous communications via serial parallel, local area network, wide area network, and other hardware interfaces as required by the adaptive optimization software system including but not limited to radio frequency (RF) techniques, modems, satellite, wires, fiber optics, and telemetry.

The communication translator object's 26 communications can be either coded or non-coded, depending on the abilities of the receiving entity. Communications between ISOs 10 are coded in a protocol specific to ISOs 10. Communication between ISOs 10 and non-ISOs can be of any protocol required by that non-ISO (e.g. visual and non visual representation of numbers, alphanumeric text, strings, images, and sound), and include serial data, parallel data, local area network, and wide area network protocols. As an ISO 10 encounters new input sources, communication translator objects 26 also provide a framework by which new ways of communicating can be continually added to an ISO 10. Communication translator objects 26 can "remember" by storing data regarding their own operation. These data may be accessible to other internal software objects in the same ISO 10 as the communication translator objects 26 or to other ISOs 10, but may not be directly accessible by the user Although ISOs 10 normally communicate with other ISOs 10 and real-world devices through communication translators 26, ISO's 10 internal software components know about the attributes and behaviors of ISO's 10 internal software objects and can communicate directly with other ISOs' 10 internal software components. For example, optimizer objects 22 in one ISO 10, having an awareness and knowledge of how they, as optimizer objects 22, require data, can pass data to another ISO's 10 optimizer object 22 without the need for an intervening communication translator 26, if so configured.

Each ISO 10 interacts with its environment and other ISOs 10 in a variety of ways. ISO 10 has the ability to procreate itself, or copy itself, or be copied, given its meta-knowledge of itself including rules regarding itself and how it interacts with the computer environment and other ISOs 10. ISO 10 in effect lives and acts in a distributed sense, given the computing environment's ability to support concurrent and/or distributed processing; accordingly, ISO 10 can be created and "live" anywhere within one or more computer systems and interact with other ISOs 10 that are also anywhere within that computer system or those computer systems provided that the computer system provides a communication means which is either externally or internally controlled. In this manner, ISOs 10 can be connected to, embedded within, or hierarchically envelope physical things which have processes to be controlled. For example, ISOs 10 can be embedded (physically sited) in a physical device, thereby providing sensory input for the ISOs' 10 state and the state of the other ISOs 10 outside the physical device in which it is embedded, transforming the physical entity containing ISOs 10 into an intelligent physical entity. This physical siting of an ISO 10 within a physical device has particular application to the field of robotics.

Further, ISO 10, using sensor objects' 25 data, predictor objects 18 and adaptive models objects 20, can also simulate and/or predict future process performance as well as determine the effectiveness of ISO's 10 modeling of future process performance. The adaptive optimization software system can therefore be used in a simulation mode; in the simulation mode, simulated and/or calculated sensor and actuator data may be used in place of data from real-world sensors and actuators. Simulation of real or abstract systems occurs by having an ISO 10 evaluate or interrogate a model of a real or abstract thing or system or evaluate and/or interact with rules associated with the real or abstract thing.

A user can initially, configurably, or in real time interface with ISO 10 to modify or otherwise alter rules, goals, and optimization criteria. Additionally, expert system objects 12, optimizer objects 22, predictor objects 18, and adaptive models objects 20 communicate and configurably interact with each other adaptively, automatically changing each other's behavior in real time without human intervention, including creating and deleting other internal software objects; for example, an optimizer object 22 can modify expert system objects' 12 rules knowledge bases 13, and an expert system object 12 can modify optimizer objects' 22 optimum goals to be sought.

Given the adaptive nature of ISOs 10, the instant invention's adaptive optimization software system has the ability to create new solutions to given problems. Expert system objects 12, acting within the knowledge, objectives and procedures contained within the expert system objects' 12 rules knowledge bases 13 and specific ISO 10 state values, can create, modify, or even destroy predictor objects 18, adaptive models objects 20, optimizer objects 22, communication translator objects 26, and sensor objects 25. The ability of an ISO's 10 internal software objects to modify other ISO 10 internal objects' rules, methods, and optimization criteria allows an adaptive optimization software system made of ISOs 10 to dynamically change its models and achieve optimization in real-time without having to stop the process being controlled or the process control system.

ISO's 10 continuous mapping and restructuring of input/output relationships constitutes "learning". Any of the rules, models, and equations used by ISO 10 can be represented in a form that ISO 10 can automatically adapt and change over time in response to built-in measuring of error between model predictions and the actual sensor readings that occur after the predictions are made. Accordingly, regardless of the model type, ISO 10 can continuously modify its models to better map these models to the multidimensional reality that is being continuously logged by each of its sensor objects 25.

Further, adaptive models objects 20 allow optimizer objects 22 to determine "optimum conditions" for a given sampling delta. If the adaptive models objects' 20 models include design parameters that describe the physical design and functionality of the entity represented by ISO 10 and that affect performance, ISO's 10 optimization methods can actually be used to invent better ways for ISO 10 to do its basic tasks.

Each ISO 10 is also given a definition of its own "fitness" or performance objectives or goals; fitness, ie. localized performance objectives, can be economically based, mathematical function based, rules based, or arbitrarily defined by a human user when configuring ISO 10. These objectives or goals are defined and activated during initial configuration either by a human user or by software scripting templates, but can also be altered in real-time by a human user, expert system object(s) 12 using its rules knowledge base 13, or optimizer object(s) 22.

ISOs 10 can also influence other ISOs 10 in the instant invention's adaptive optimization software system. In addition to training its own models, ISOs 10 can train or teach other ISOs 10 by giving to the other ISOs 10 trained models, rule sets, fuzzy logic membership functions, or objects and goals used by the communicating ISO 10 to the other ISOs' 10 optimizer object(s) 22 that the sending ISOs 10 has deemed to be effective and correct. An ISO 10 can also teach by mapping coded representations (e.g., mathematical models) to a representation that is understood by a receiving entity. An example of this is mapping a multidimensional surface of ISO 10 inputs to outputs in linguistic terms that include either crisp representations or fuzzy representations. It is also possible to go from linguistic representations to mathematical ones and plot the results in two, three, or four dimensional forms.

Similarly, an ISO 10 can influence other ISOs 10 objectives or goals in the adaptive optimization software system by communicating fitness or performance objectives or goals to those ISOs 10.

The instant invention includes an intuitive, graphical user interface which provides a formalized procedure to specify ISO 10 interconnection as well as the objective functions, fitness criteria, and goals to be handled by and within ISOs 10. To form an adaptive optimization software system, a user uses the adaptive optimization software system's user interface to configure, define, and select which of ISO's 10 internal software objects to enable and the initial parameters, goals, and methodologies to be used by the enabled internal software objects. From an ISO's 10 initial set of parameters, goals, and methodologies, the user selects, configures, and enables a set of internal objects and defines their initial set of parameters, goals, and methodologies to produce the embodiment of the relationship(s) between that ISO 10 and either the process sought to be monitored and optimally controlled or other ISOs 10. The user continues this process until the user is satisfied that the process sought to be controlled is adequately modeled.

More specifically, as illustrated in FIGS. 2 through 8, users can configure two or more ISOs 10 or groups of ISOs 10 in a manner which mimics the order of communication of information between components to be controlled, i.e. they are "flow" ISOs 10 connected in a relationship that models, or representationally corresponds to, the flow of the material or information which is to be controlled. The connection of "flow" ISOs 10 embodies characteristics that reflect the ordered flow of information or material between components (tangible or intangible), and are in communication with and maintain control over abstractions, devices, and/or real-world processes.

Using the instant invention's graphical user interface, the user can also configurably connect two or more ISOs 10 or groups of ISOs 10 into hierarchical sets of relationships, making these ISOs 10 "hierarchy" ISOs 10, thus defining the prioritization and scope relationships between ISOs 10 or groups of ISOs 10. A "hierarchy" ISO 10 logically encapsulates a group of other ISOs 10 by being configured with a higher hierarchy value, e.g. a higher priority or higher level set of optimization goals, and embodies a higher level abstraction within the adaptive optimization software system. Although "hierarchy" ISOs 10 by definition communicate with other ISOs 10 in their hierarchy, a hierarchy ISO 10 may be configured to either communicate or not communicate with other ISOs 10, groups of ISOs 10, or real-world devices not within their hierarchy.

An ISO 10 can therefore be connected as a "flow" ISO 10; a "hierarchy" ISO 10; or a "flow-hierarchy" ISO 10 which combines both flow ISO 10 and hierarchy ISO 10 characteristics. The ability to logically encapsulate (i.e. relate hierarchically) an ISO 10 within another ISO 10 permits virtually unlimited hierarchical levels within ISO 10 hierarchy. As each ISO 10 can have a virtually unlimited number of sensor objects 25, and as a virtually unlimited number of ISOs 10 can be flow connected to each other, the instant invention provides for virtually unlimited numbers of component-level process control set points. Thus, after a user has configured and initialized an adaptive optimization software system, "flow" ISOs 10 relate to processes, devices, and abstractions to be controlled and/or optimized, e.g. a motor or cost per unit. Further, in the typical case, users configure and initialize an adaptive optimization software system into groups of "flow" ISOs 10 organized into a hierarchy, forming higher and higher level abstractions of the process to be controlled and optimized, in turn representing the entire system to be controlled by the instant invention's adaptive optimization software system, e.g. a motor ISO 10, driveshaft ISO 10, and wheels ISOs 10 are organized into a hierarchy representing a drivetrain ISO 10, and a drivetrain ISO 10 organized with other ISOs 10 or groups of ISOs 10 to represent and control a train.

In the preferred embodiment, each ISO 10 focuses its optimization on ISO's 10 level in the hierarchy and downward; ISOs 10 on the very lowest hierarchy levels focus on and enforce highly localized optimization. Each higher level in the hierarchy enforces an increasingly less localized, more encompassing optimization until at the top of the adaptive optimization software system, the highest ISO 10 in the hierarchy—a "pyramid"—seeks high level, more general goals, and accordingly enforces "global" or system-wide optimization. In this way, an adaptive optimization software system implemented with ISOs 10 provides both local (component) and global, or aggregate, goal-seeking behavior that ties a process control system together into a powerful unified process control optimization system while achieving the highest optimization congruent with user defined objectives which can include global, aggregate business goals. The hierarchical nature of instant invention as initially configured by a user or as adaptively modified in real-time by an ISO 10 or user provides this desired optimization concurrently at all levels of the hierarchy, from specific, component-oriented, narrowly focused optimization to the broadest, global level optimization. It is also possible for users to flexibly, and arbitrarily, configure an ISO's 10 or an adaptive optimization software system's hierarchy differently than top-to-bottom.

One of the primary objectives of the adaptive optimization software system is to automatically employ both ISO's 10 individualized optimizing objective functions and the more globally focused, management-defined system-wide objectives to determine optimum process set points for the system as a whole. Accordingly, an adaptive, object-oriented software optimization system comprising ISOs 10 configured into flow ISO 10, hierarchy ISO 10, and flow-hierarchy ISO 10 relationships continually evaluates overall system performance with regard to the optimization goals set up for the real-time processes, automatically adapting and modifying each ISO's 10 rules and methodologies to attain user defined objectives which can include global, aggregate business goals. In this manner, the instant invention automatically optimizes processes and systems consistent with management objectives without the need for continuing human intervention. Because the adaptive models objects 20 can use a multiplicity of concurrent, competing modeling methodologies, an adaptive optimization software system comprised of ISOs 10 achieves concurrent multi-level optimization.

For example, a corporation may have two operating plants. The user associates an ISO 10 with the corporation as a whole as the first, or highest, level hierarchy "pyramid" ISO 10, and associates an ISO 10 with each individual plant as the next lower, or second, level in the hierarchy. Even though each of the second level ISOs 10 may have their own optimum control objectives, these optimum control objectives may not achieve system-wide optimization. The highest level ISO 10, the corporation ISO 10, can influence each of the second level ISOs 10 to maximize optimum control objectives for the corporation as a whole, rather than having each of the second level ISOs 10 independently maintain their own optimum control objectives.

Additionally, an adaptive optimization software system can be used to simulate a real-world process, enabling training of end users in operating or working on a real-world process being simulated.

In FIGS. 2 through 22, reference to an ISO 10 as "ISO 10" followed by a letter or letter and number, e.g. ISO 10A or ISO 10B1, is meant to mean an instance of an ISO 10. Similarly, reference to an internal software object followed by a letter or letter and number is also meant to be an instance of said object, e.g. real-world instrumentation 30A1 is an instance of real-world instrumentation 30.

Figure 2:
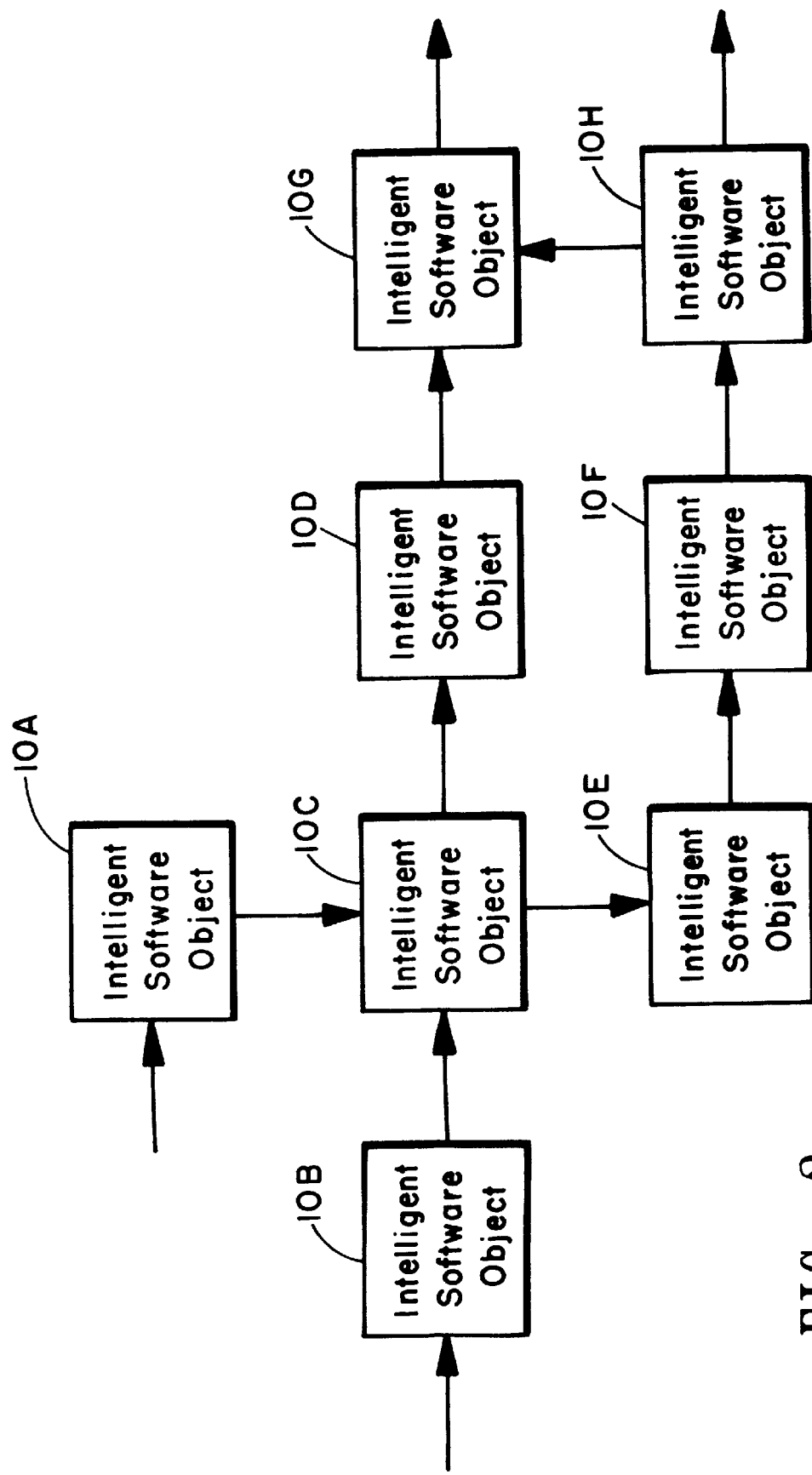
FIG. 2 is a block diagram illustrating the interconnection of one ISO to another in accordance with the present invention.

Referring to FIG. 2, ISO 10A through ISO 10H are connected as flow ISOs 10 showing ordered flow of information from one to another. The connections between ISOs 10, e.g. between ISO 10A and ISO 10C, represent the flow of concrete information from one ISO 10 to another such as information representing physical items such as parts or materials, or abstract information from one ISO 10 to another such as instructions or cost constraints.

Figure 3:
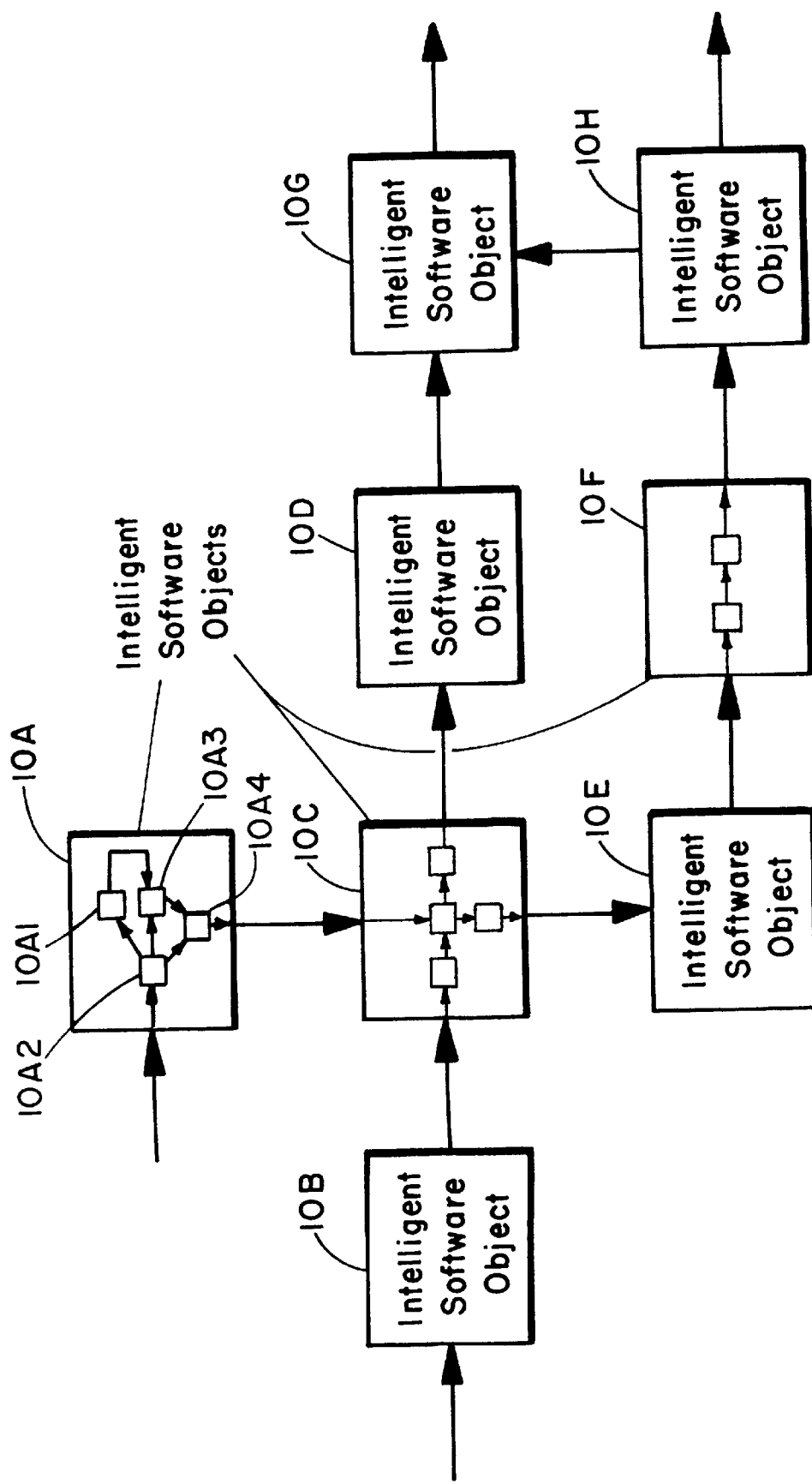
FIG. 3 is a block diagram illustrating the interconnection of ISOs located within a hierarchy with respect to other ISOs in accordance with the present invention.

Referring to FIG. 3, ISO 10 can also be configured for use as a "container" (i.e. relate hierarchically) for other ISOs 10, thus creating a hierarchy of ISOs 10 or even groups of ISOs 10. In FIG. 3, "flow" ISOs 10A1 through 10A4 are "contained" hierarchically within ISO 10A to illustrate ISOs 10 contained within another ISO 10, thus creating a hierarchy between sets of ISOs 10. In this case, the internal software objects and other items associated with the "container" ISO 10A relate to an ISO 10 or group of ISOs 10 contained in the container ISO 10, e.g. ISO 10A1 through ISO 10A4. Container ISO's 10A internal software objects can be used to send objectives, goals, constraints or orders (instructions or directions) to the contained ISOs 10, ISO 10A1 through ISO 10A4.

Figure 4:
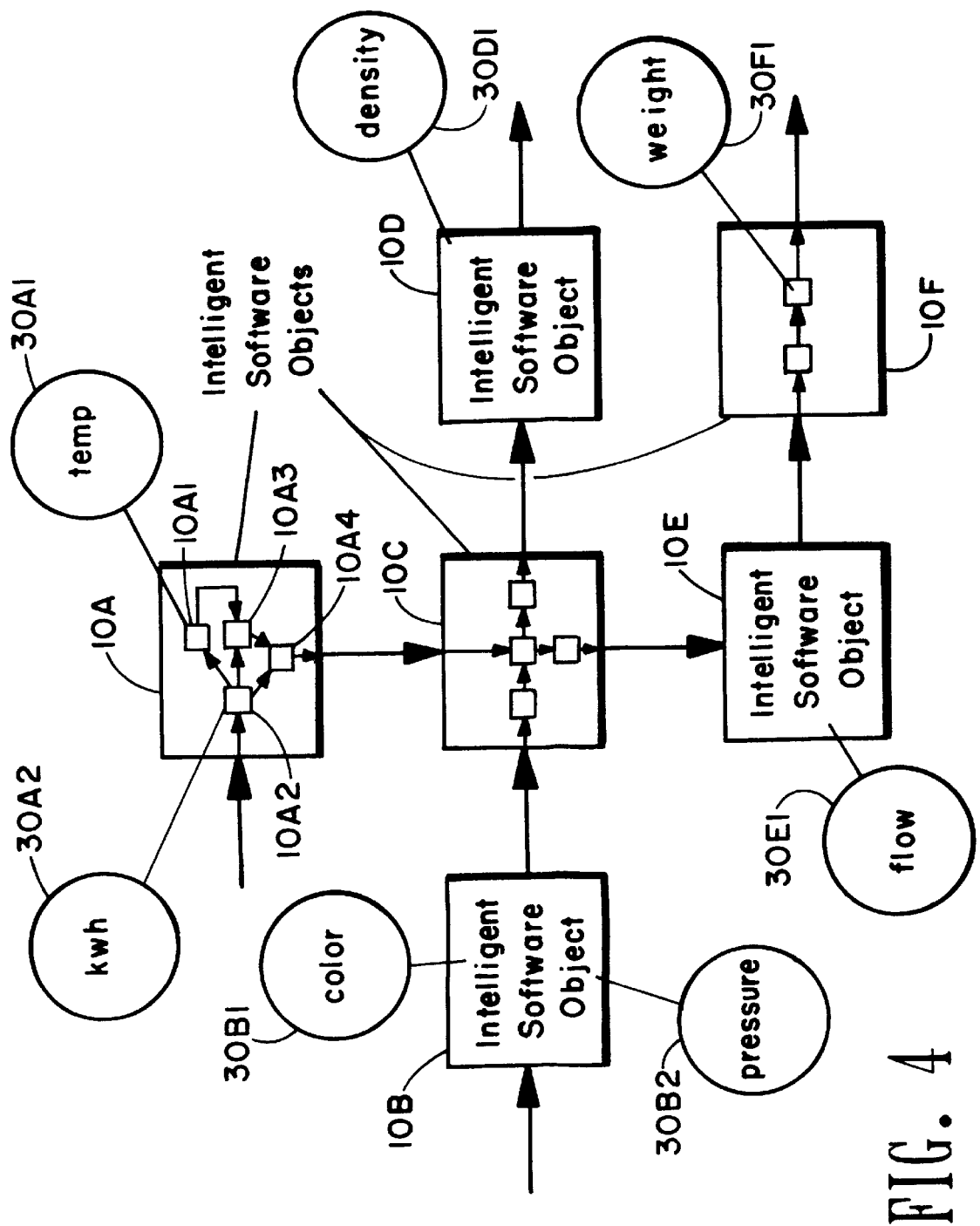
FIG. 4 is a block diagram illustrating ISOs connected to real-world instrumentation in accordance with the present invention in accordance with the present invention.

Referring to FIG. 4, ISOs 10A through 10F are in communication with each other and, through communication translator objects 26 within ISOs 10A1 and 10A2, with real-world instrumentation 30A1 and real-world instrumentation 30A2 whose states are dynamically captured into sensor objects 25 in ISO 10A1 and ISO 10A2. As illustrated by ISO 10B, real-world state variables can be static, such as real-world instrumentation 30B1 which represents a color, or dynamic, such as real-world instrumentation 30B2 which represents pressure.

Figure 5:
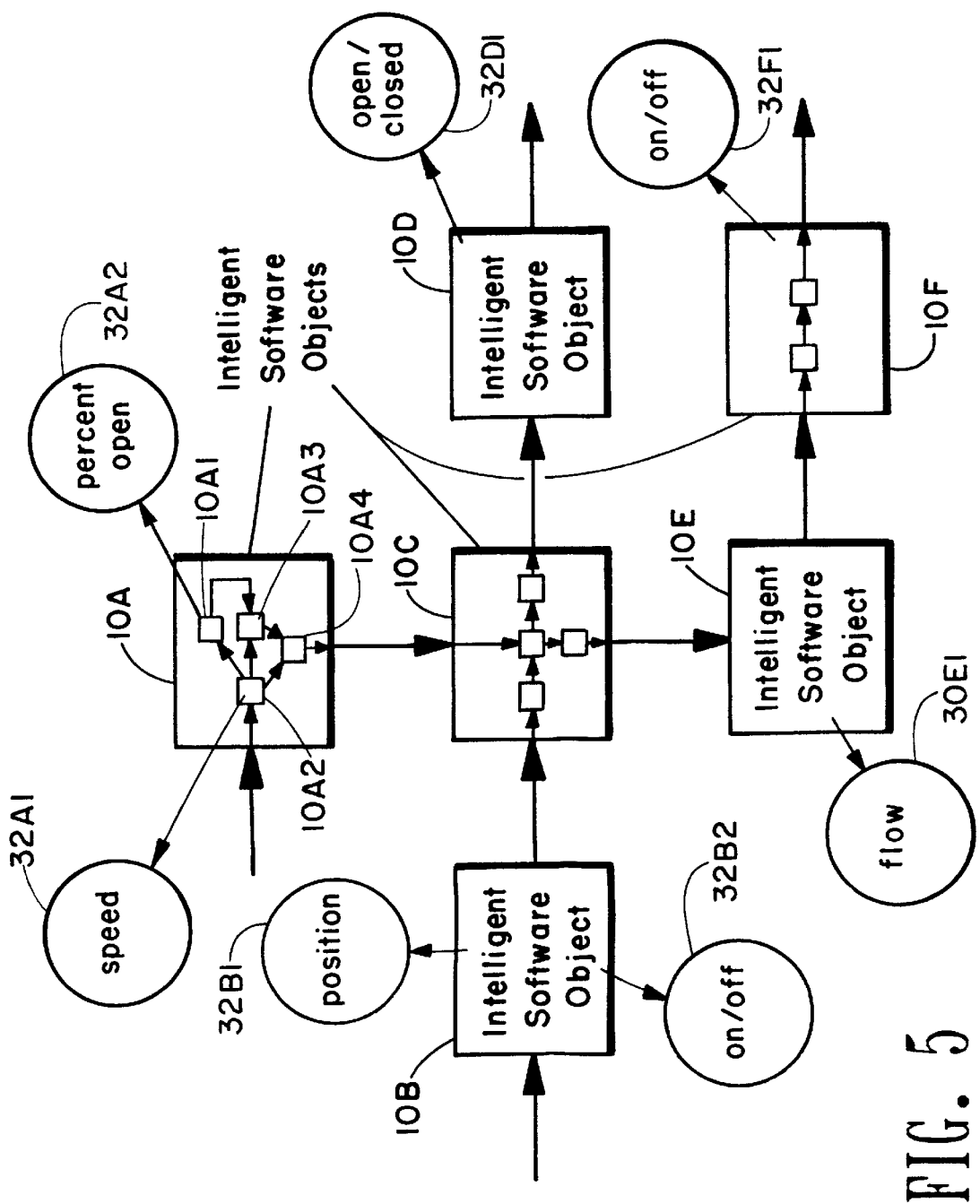
FIG. 5 is another block diagram illustrating ISOs connected to real-world control devices in accordance with the present invention.

Referring to FIG. 5, ISOs 10A through 10F are in communication with real-world control devices 32 to illustrate the concepts of control actions. For example, through its communications translator objects 26 and using its sensor objects 25, expert system objects 12, rules knowledge bases 13, predictor objects 18, adaptive models objects 20, and optimizer objects 22, ISO 10A sends state values to ISO 10C. ISO 10A1 sends a control command regulating speed to real-world control device 32A1 through one of ISO 10A1's communication translator objects 26.

Figure 6:
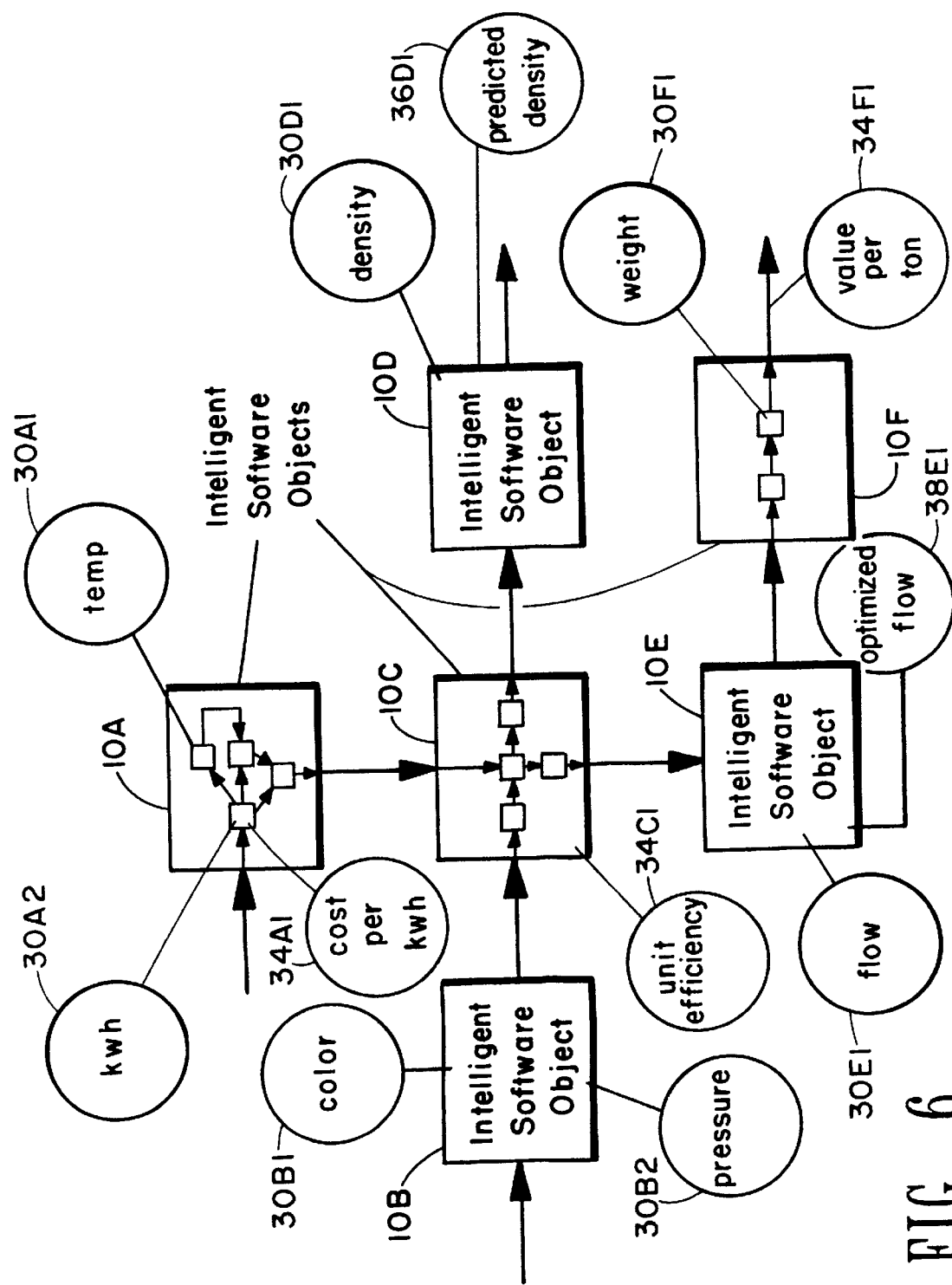
FIG. 6 is a block diagram illustrating ISOs connected to real word sensors and calculated, economic, predictor and optimizer based state variables in accordance with the present invention.

Referring to FIG. 6, an adaptive optimization software system is exemplified. ISO 10A is in communication with real-world instrumentation 30A1, real-world instrumentation 30A2, and economic state variable 34A1; ISO 10B is in communication with real-world instrumentation 30B1 and real-world instrumentation 30B2; ISO 10C is in communication with economic state variable 34C1; ISO 10D is in communication with real-world instrumentation 30D1 and has a predicted state variable 36D1; ISO 10E is in communication with real-world instrumentation 30E1 and has an optimizer state variable 38E1; and ISO 10F is in communication with real-world instrumentation 30F1 and has economic state variable 34F1.

Figure 7:
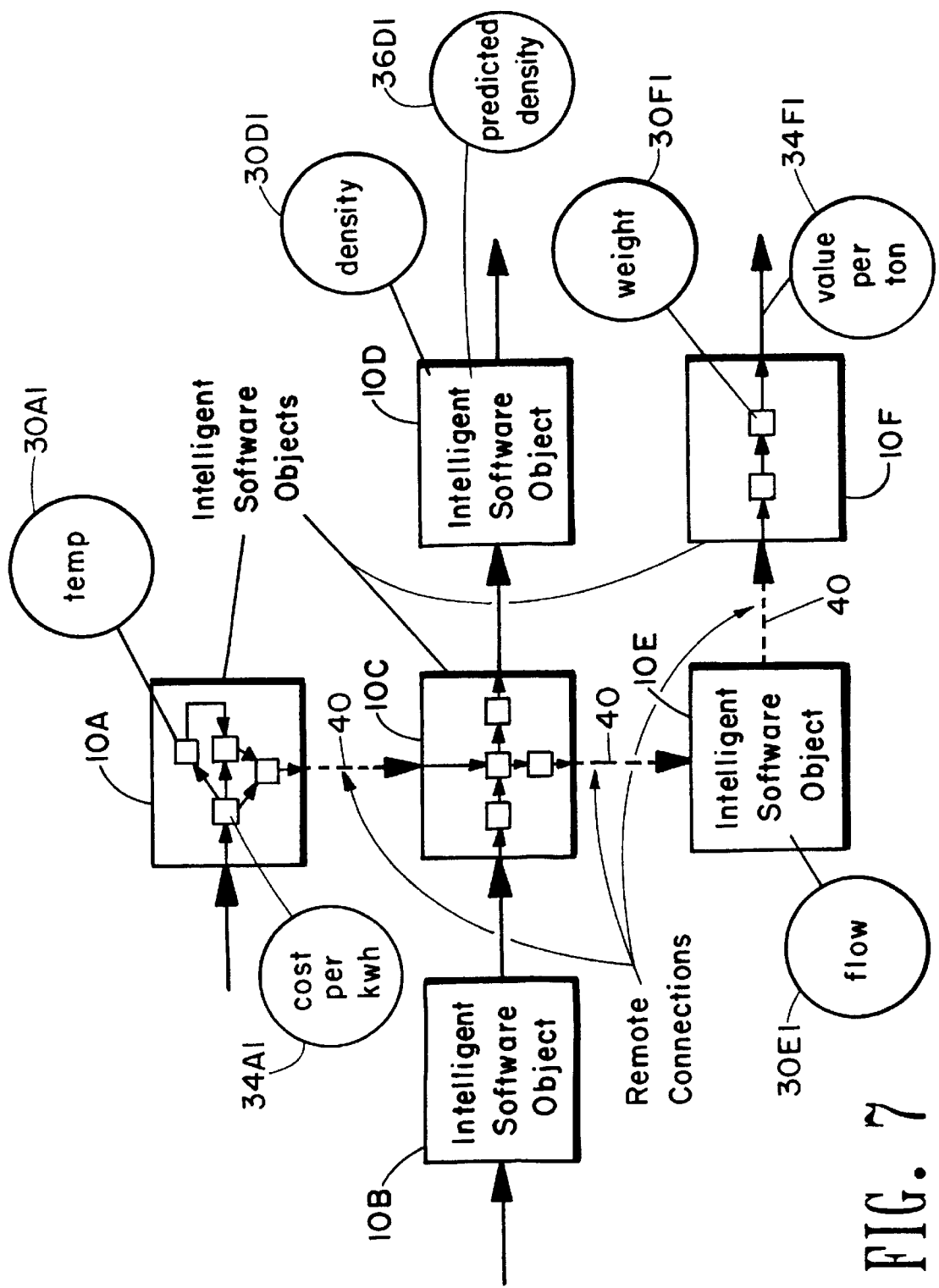
FIG. 7 is a block diagram illustrating ISOs connected to each other through remote connections in accordance with the present invention.

Referring to FIG. 7, a plurality of ISOs 10 are in communication with one another (for communication with each other) through remote connections 40. Remote connections 40 are made in many ways, including but not limited to, RF techniques, modems, satellite, wires, fiber optics, telemetry, and local or wide area networks.

Figure 8:
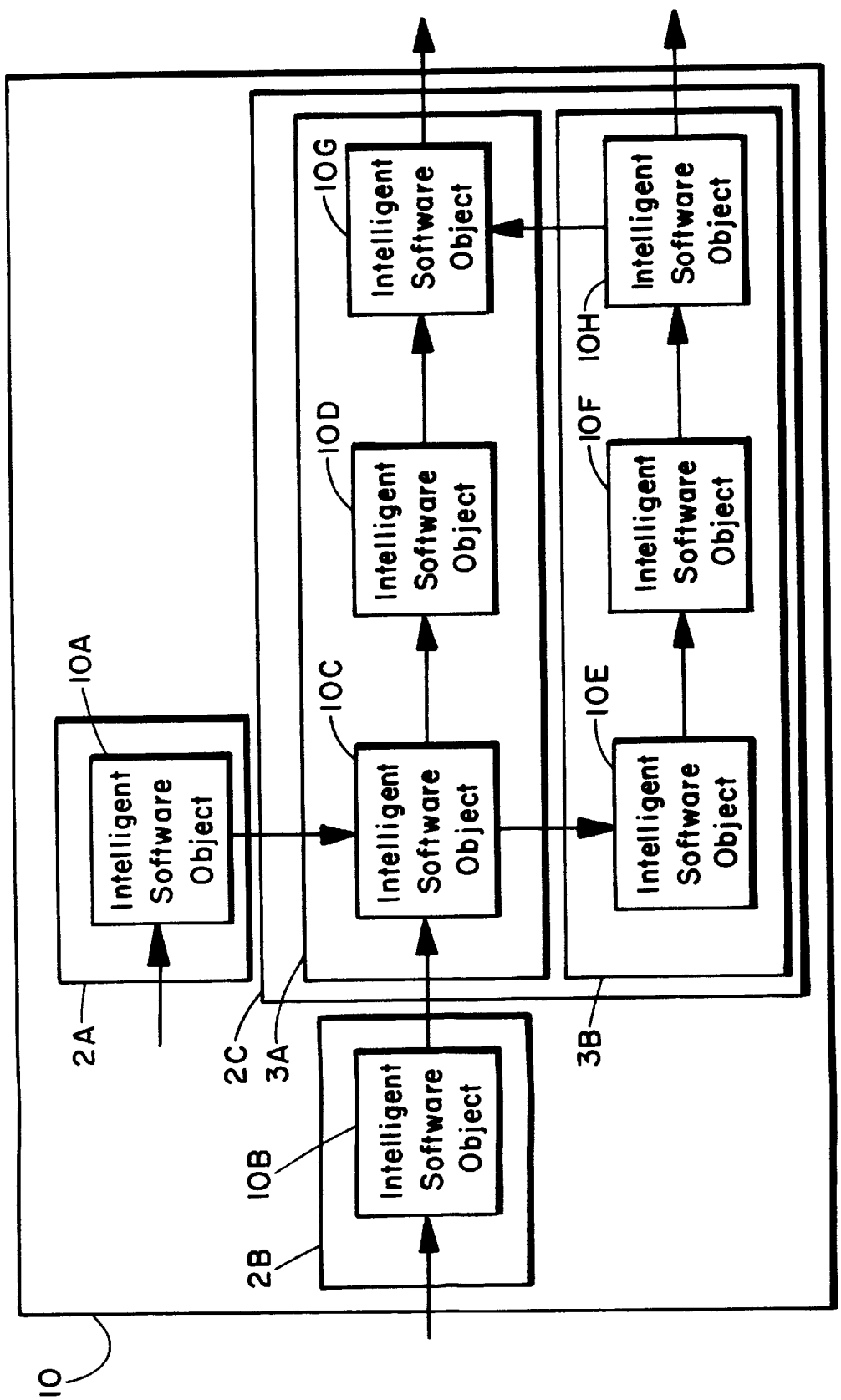
FIG. 8 is a block diagram illustrating the flow between ISOs organized in a hierarchy in accordance with the present invention.

Referring to FIG. 8, a plurality of ISOs 10 are connected in a hierarchy. ISO 10 hierarchically contains ISO 2A, ISO 2B, and ISO 2C. ISO 2A hierarchically contains ISO 10A; ISO 2B hierarchically contains ISO 10B; and ISO 2C hierarchically contains ISO 3A and ISO 3B. Further, ISO 3A hierarchically contains ISO 10C, ISO 10D, and ISO 10E; ISO 3B hierarchically contains ISO 10F, ISO 10G, and ISO 10H. When ISOs 10 are arranged in this manner, they may represent abstract concepts such as a company, plant or plant area that is made up of ISOs 10 that are hierarchically contained within the group.

A description of an ISO's 10 specific internal software objects and their interaction with other internal software objects as well as with other ISOs 10 and real world devices will now be described.

Figure 9:
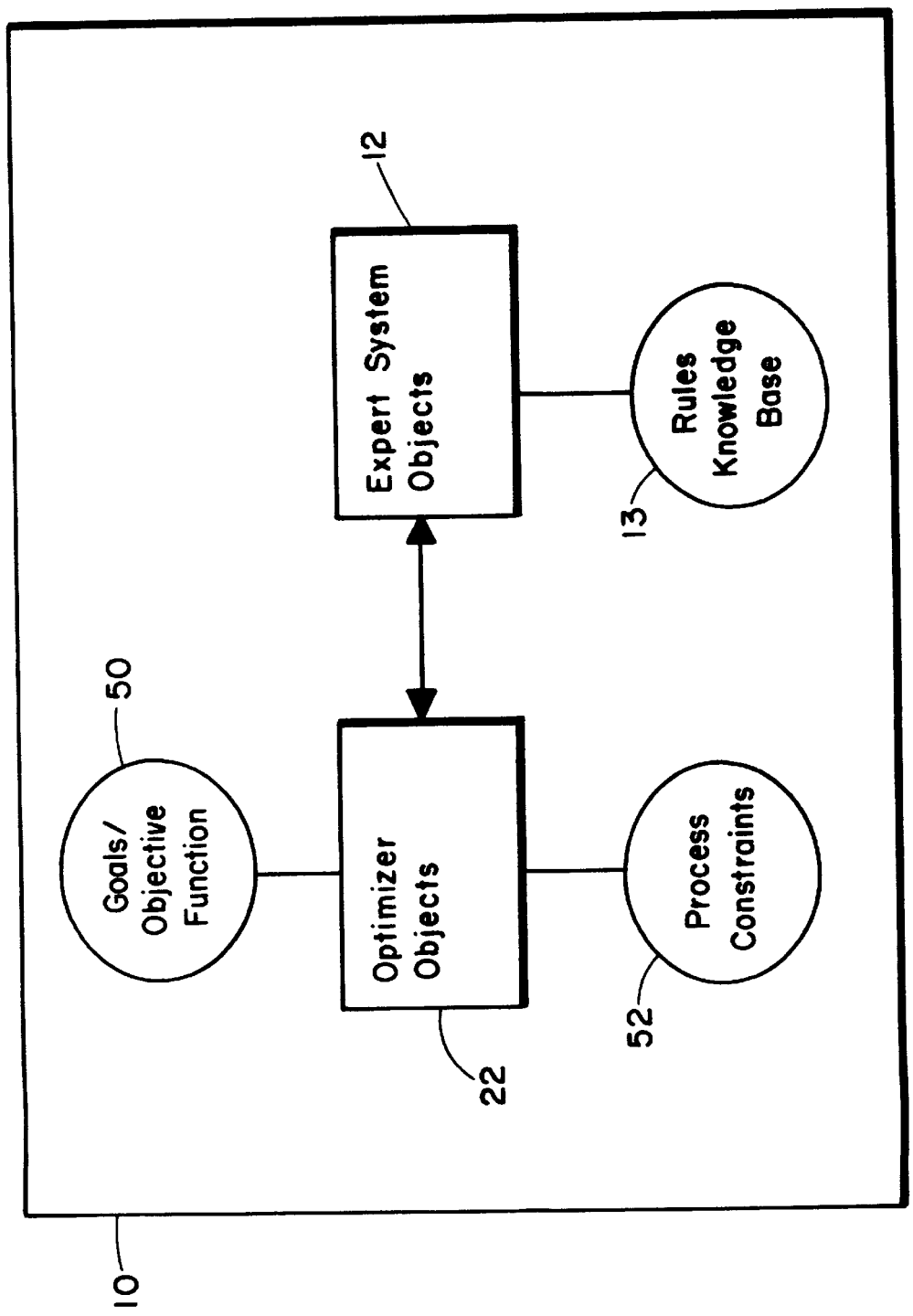
FIG. 9 is a block diagram illustrating how optimizer objects and expert system objects interact.

FIG. 9 illustrates how optimizer objects 22 and expert system objects 12 interact within ISO 10. Expert system objects 12 are capable of utilizing one or more rules knowledge bases 13 holding linguistic rules providing behavior and control strategies for achieving the goals, objectives, and business logic appropriate for ISO 10. Using crisp logic rules 14 and/or fuzzy logic rules 16 contained in rules knowledge bases 13, expert system objects 12 can modify optimizer objects 22 by changing optimizer object's 22 goals/objective function 50 definitions or configuration. For example, expert system object 12 may be configured with a rules knowledge base 13 containing crisp rules 14 and/or fuzzy rules 16 that modify an optimizer object's 22 goals/ objective functions 50 based on the availability of raw feed material associated with ISO's 10 process.

Figure 10:
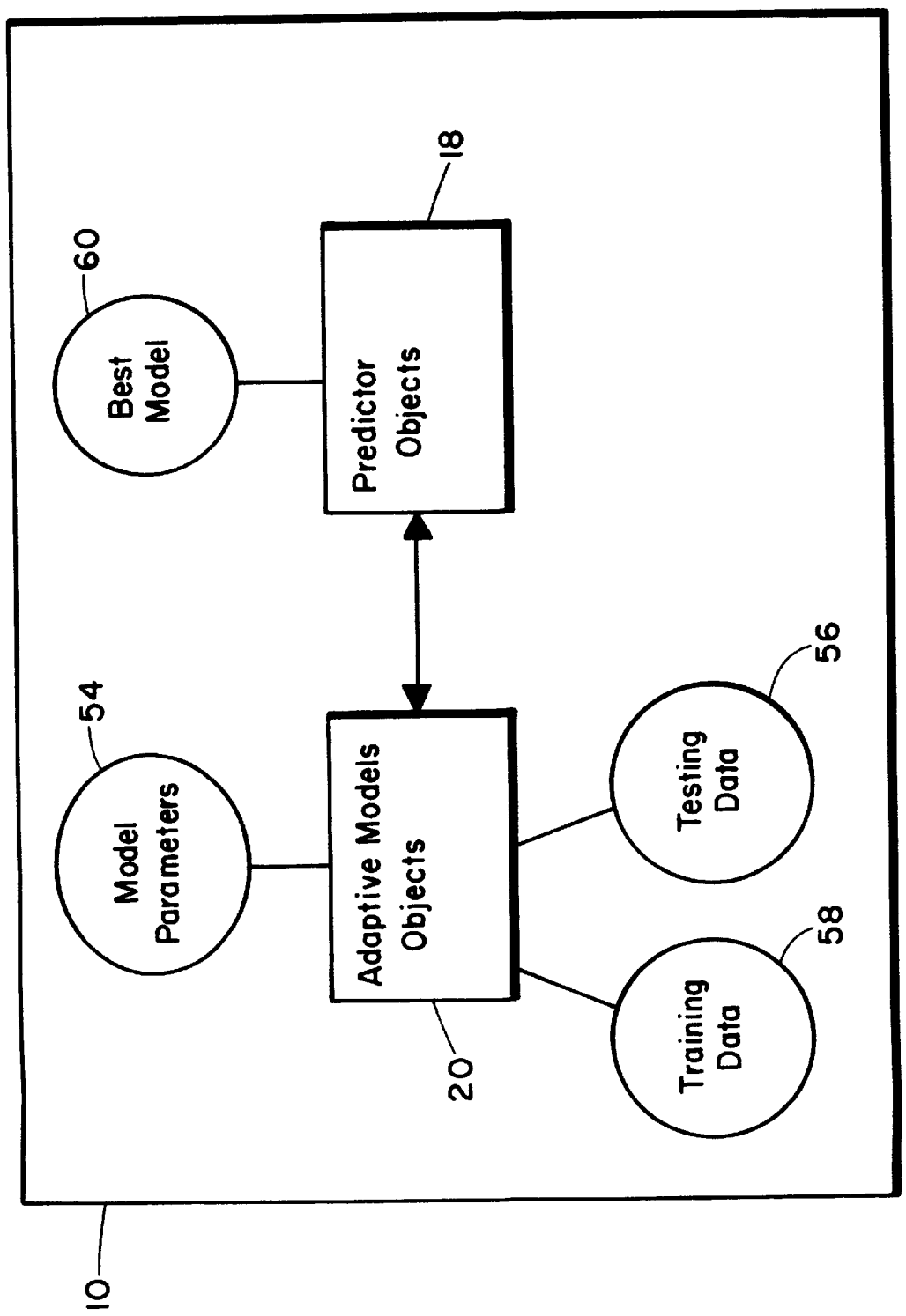
FIG. 10 is a block diagram illustrating how adaptive models objects and predictor objects interact.

FIG. 10 illustrates how adaptive models objects 20 and predictor objects 18 interact. Predictor objects 18 provide ISO 10 with an adaptive model of the process to be controlled that ISO 10 represents along with that adaptive model's data. Comparing each current adaptive model's actual prediction of the process to the response, predictor object 18 identifies which one of all of its adaptive models is predicting most accurately; that adaptive model is then identified as the predictor object's 18 best model 60.

Figure 11:
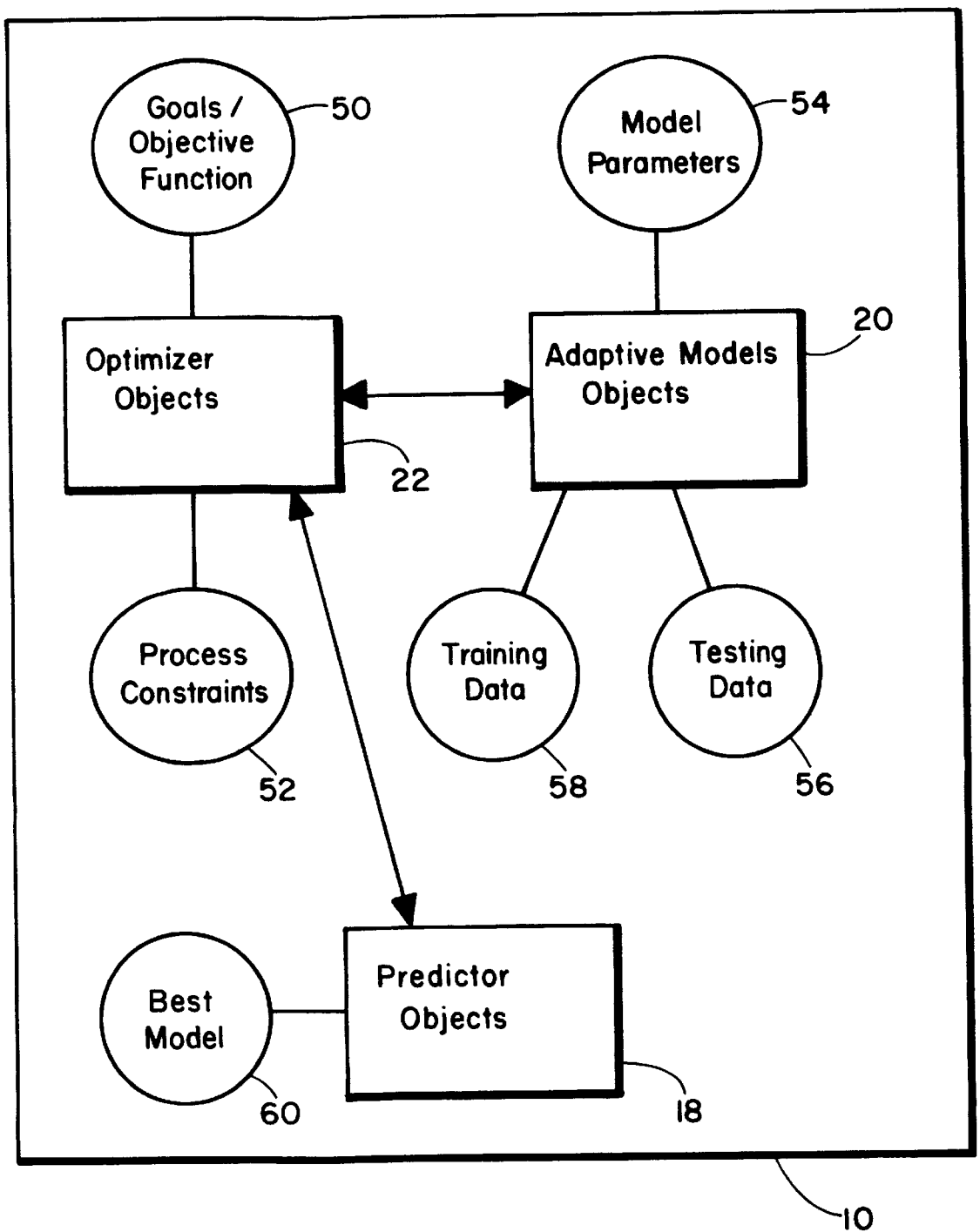
FIG. 11 is a block diagram illustrating how optimizer objects and adaptive models objects interact.

FIG. 11 illustrates how optimizer objects 22 and adaptive models objects 20 interact. Optimizer object 22 is configured with goals/objective functions 50 appropriate for ISO 10 within an adaptive optimization software system. Optimizer object 22 can be configured with process constraints 52 that identify limitations in the process to be controlled that optimizer object 22 should not violate when working to achieve ISO's 10 specified goals/objective functions 50. FIG. 11 further illustrates how optimizer objects 22 and predictor objects 18 interact. Optimizer objects 22 determine the conditions which best achieve optimizer object's 22 goals/objective functions 50 by using predictor object 18 and predictor object's 18 best model 60 to predict the future performance of the process ISO 10 represents based on the conditions that optimizer object 22 supplies to the predictor object 18. Optimizer object 22 finds the conditions which best achieve its goals/objective functions 50 without violating process constraints 52 by using adaptive models objects 20 to simulate, calculate, or predict future performance of the process. Optimizer object 22 knows which adaptive models objects 20 to use by consulting predictor object 18 to find predictor object's 18 best model 60. The optimization process proceeds iteratively as optimizer object 22 selects trial conditions that are possible solutions to achieving optimizer object's 22 goals/objective functions 50, then passing these trial conditions to adaptive models object 20. Adaptive models object 20 simulates the process to be controlled using optimizer object's 22 conditions, returning adaptive models object's 20 results to optimizer object 22 which then determines whether these results achieve optimizer object's 22 desired goals/objective functions 50 without violating optimizer object's 22 process constraints 52. If so, optimizer object 22 retains the results; if not, optimizer object 22 attempts a new set of trial conditions.

Figure 12:
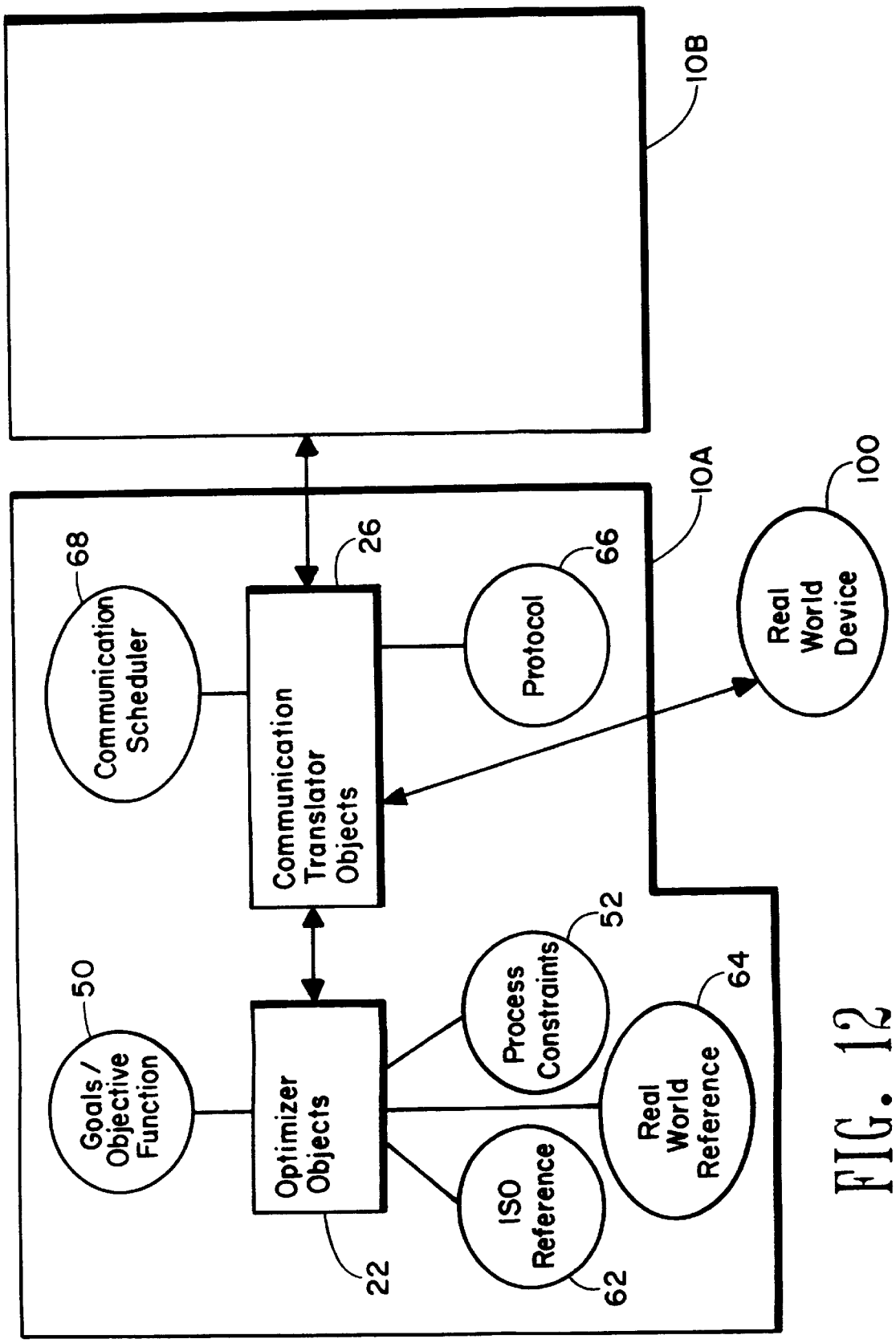
FIG. 12 is a block diagram illustrating how optimizer objects and communication translator objects interact.

FIG. 12 illustrates how optimizer objects 22 and communication translator objects 26 interact to send or receive data from ISO 10A to ISO 10B or from ISO 10A to real world device 100; as used in FIG. NOs. 12 through 22, real-world device 100 can include real-world control devices 32 as well as real-world instrumentation 30. ISO's 10A optimizer object 22 provides one of ISO's 10A communication translator objects 26 with ISO reference 52 identifying ISO 10B with which ISO 10A wishes to communicate; communication translator object 26 stores ISO reference 52 and schedules requests to retrieve the data from ISO 10B. Further, communication translator object 26 creates the request for data from ISO 10B using a protocol 66 appropriate to ISO 10B of which ISO 10A is aware. At an appropriate sampling delta, communication translator object 26 probes ISO 10B, retrieving data from ISO 10B and passing the data to optimizer object 22. Data can be retrieved from ISO 10B through communicator translator 26 when optimizer object 22 requests data from ISO 10B by optimizer object 22 issuing a request-data command to communicator translator 26, or communicated to ISO 10B when optimizer object 22 passes the data to communication translator object 26 using a transmit-data command.

As also shown in FIG. 12, ISO's 10A optimizer object 22 can request data from or provide data to real world device 100 by providing one of ISO's 10A communication translator objects 26 with real-world reference 64 identifying real world device 100; communication translator object 26 stores real-world reference 64 and schedules requests to retrieve the data from or communicate data to real world device 100 using a protocol 66 appropriate to real world device 100 of which ISO 10A is aware. At an appropriate sampling delta, communication translator object 26 probes real world device 100, retrieving data from real world device 100 and passing the data to optimizer object 22. Data can be retrieved from real world device 100 through communication translator 26 when optimizer object 22 requests data from real world device 100 by optimizer object 22 issuing a request-data command to communicator translator 26, or communicated to real world device 100 when optimizer object 22 passes the data to communication translator object 26 using a transmit-data command.

In either case, optimizer objects 22 can make asynchronous requests to read or write data on demand when necessary.

Figure 13:
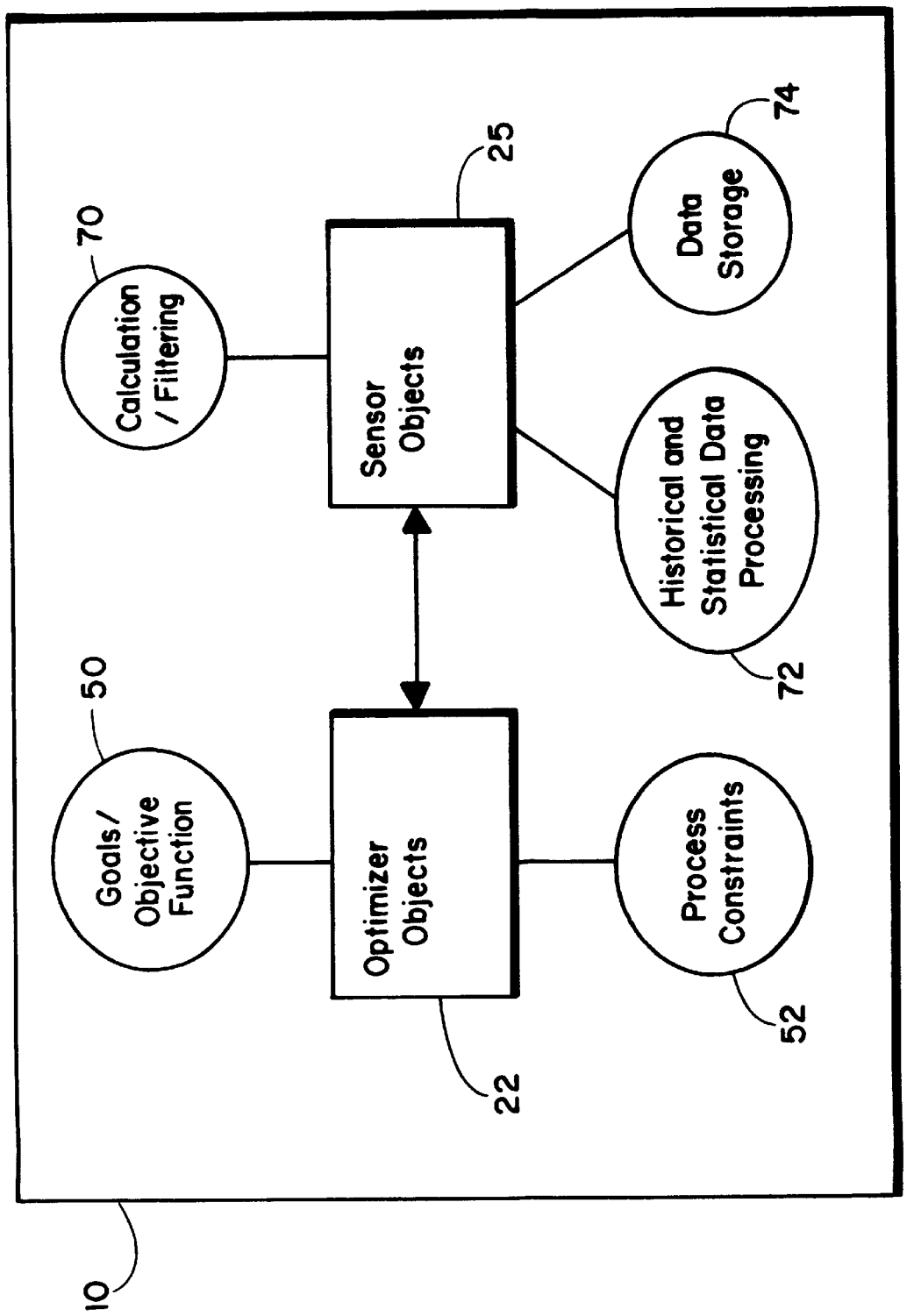
FIG. 13 is a block diagram illustrating how optimizer objects and sensor objects interact.

FIG. 13 illustrates how optimizer objects 22 and sensor objects 25 interact. Optimizer objects 22 use any combination of sensor objects' 25 current data in data storage 74 or historical and/or statistical data in historical and statistical data processing 72 to evaluate optimizer object's 22 goals/ objective functions 50, and process constraints 52 to perform optimizer object's 22 optimization.

Figure 14:
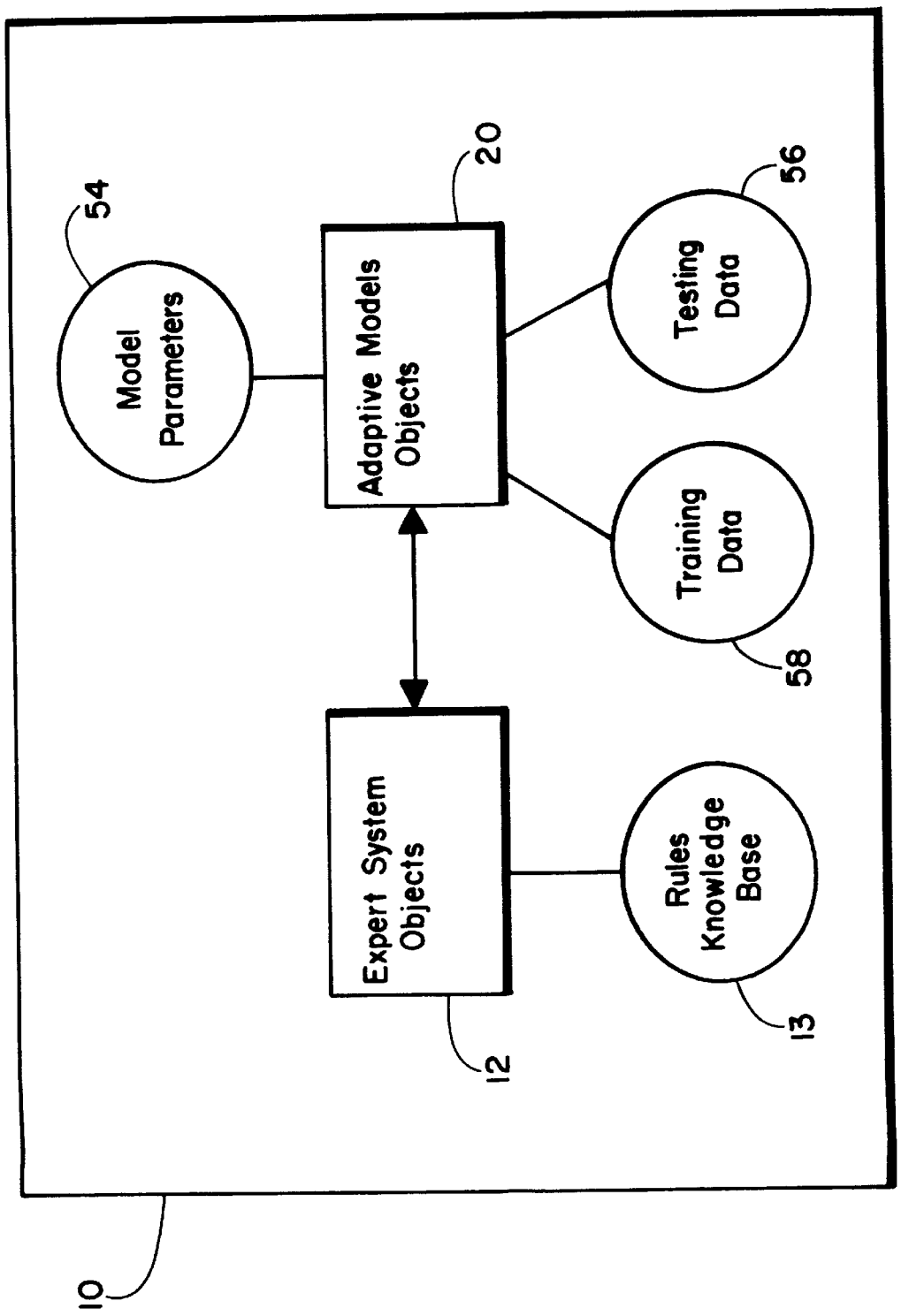
FIG. 14 is a block diagram illustrating how expert system objects and adaptive models objects interact.

FIG. 14 illustrates how expert system objects 12 and adaptive models objects 20 interact. Expert system objects 12 are capable of utilizing one or more rules knowledge bases 13 and can use the rules contained in rules knowledge bases 13 to adaptively change adaptive models object's 20 performance or configuration. For example, depending on some configurable or arbitrary condition, adaptive models object 20 may need to stop sampling for new training data 58 or testing data 56. A rule in expert system object's 12 rules knowledge bases 13 could be configured to accomplish this action. Additionally, expert system object's 12 rules knowledge bases 13 may contain a rule that stops the training process altogether depending on the values of the model parameter or training error.

Figure 15:
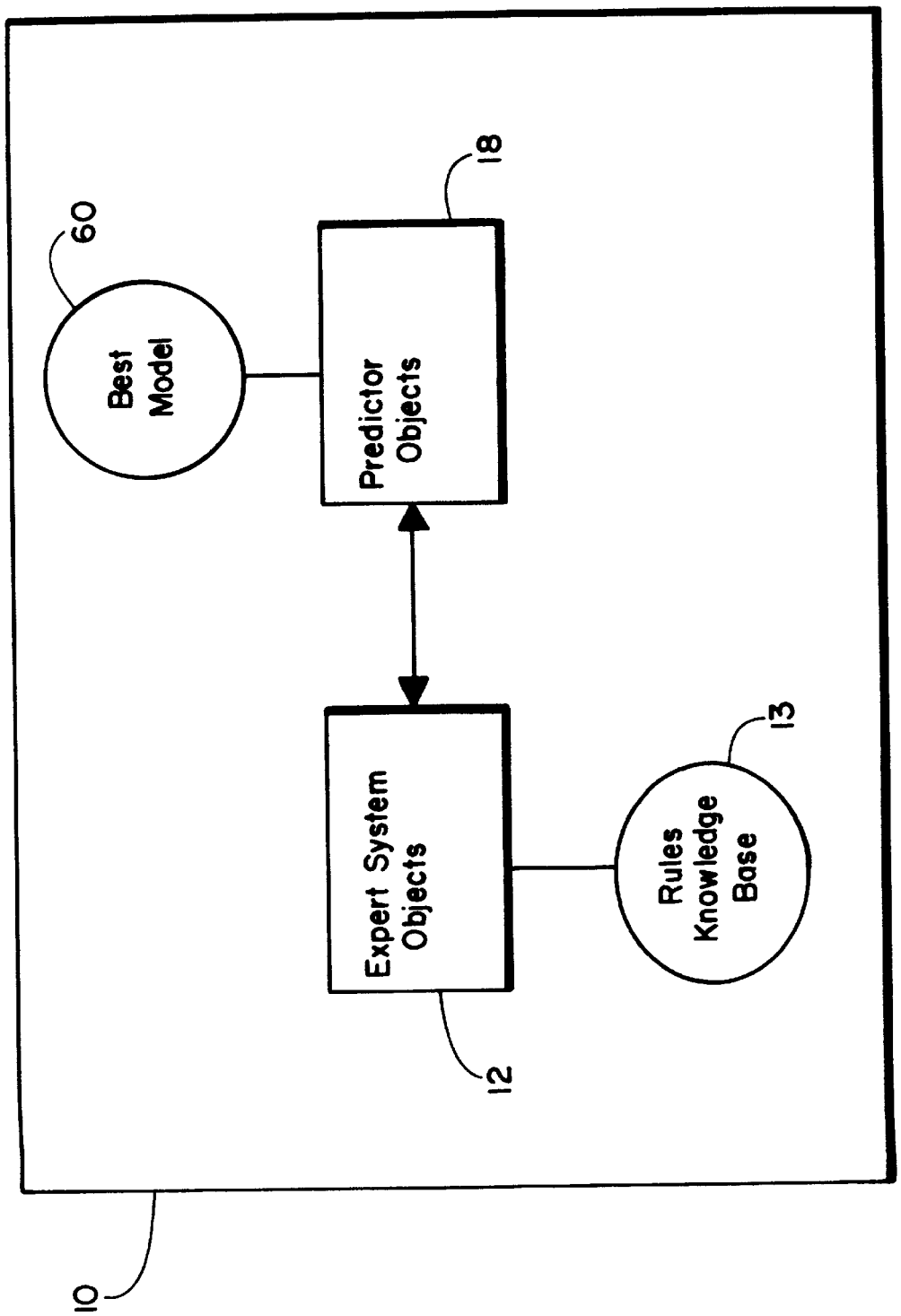
FIG. 15 is a block diagram illustrating how expert system objects and predictor objects interact.

FIG. 15 illustrates how expert system objects 12 and predictor objects 18 interact. Expert system objects 12 can use the rules contained in rules knowledge bases 13 to adaptively change predictor objects' 18 performance or configuration. For example, expert system object 12 may contain rules that cause predictor object 18 to generate a new adaptive model when the best model 60 does not accurately describe the process to be controlled.

Figure 16:
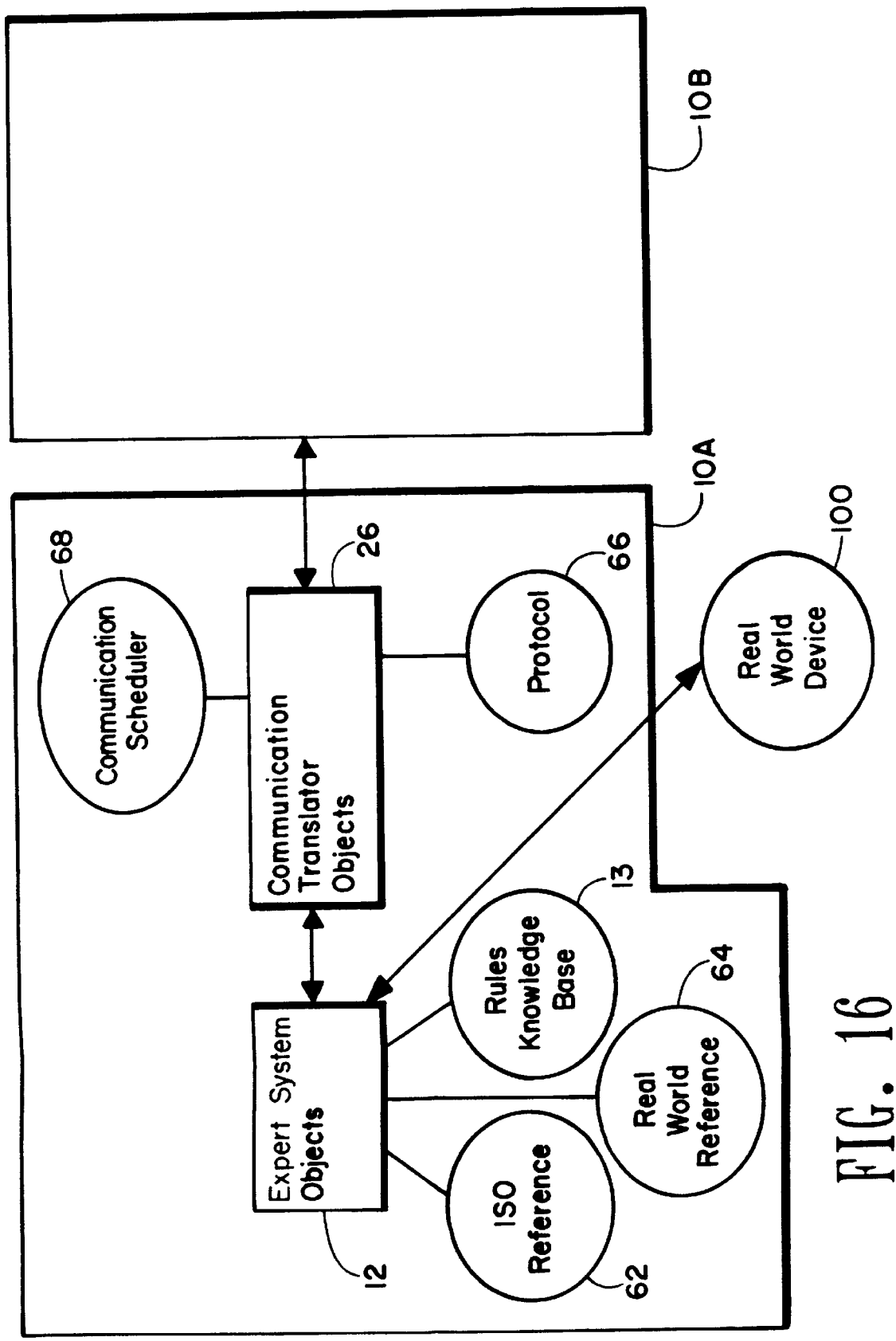
FIG. 16 is a block diagram illustrating how expert system objects and communicator translator objects interact.

FIG. 16 illustrates how expert system objects 12 and communication translator objects 26 interact. Expert system objects 12 provide communication translator objects 26 with ISO reference 62 identifying ISO 10B or real-world reference 64 identifying real world device 100 with which ISO 10A wishes to communicate. Communication translator object 26 stores the appropriate reference and schedules requests to retrieve the data from ISO 10B or real world device 100. Communication translator object 26 creates the request for data from ISO 10B or real-world device 100 using a protocol 66 appropriate to ISO 10B or real world device 100. Expert system object 12 requests data from ISO 10B or real world device 100 by issuing a request-data command to communication translator object 26. At an appropriate sampling delta, communication translator object 26 probes either ISO 10B or real world device 100 as appropriate, retrieving the data and passing the data to expert system object 12. To transmit data to ISO 10B or real world device 100, expert system object 12 passes the data to be communicated to communication translator object 26, using a transmit-data command. Expert system object 12 can make asynchronous requests to read or write data on demand when necessary.

Figure 17:
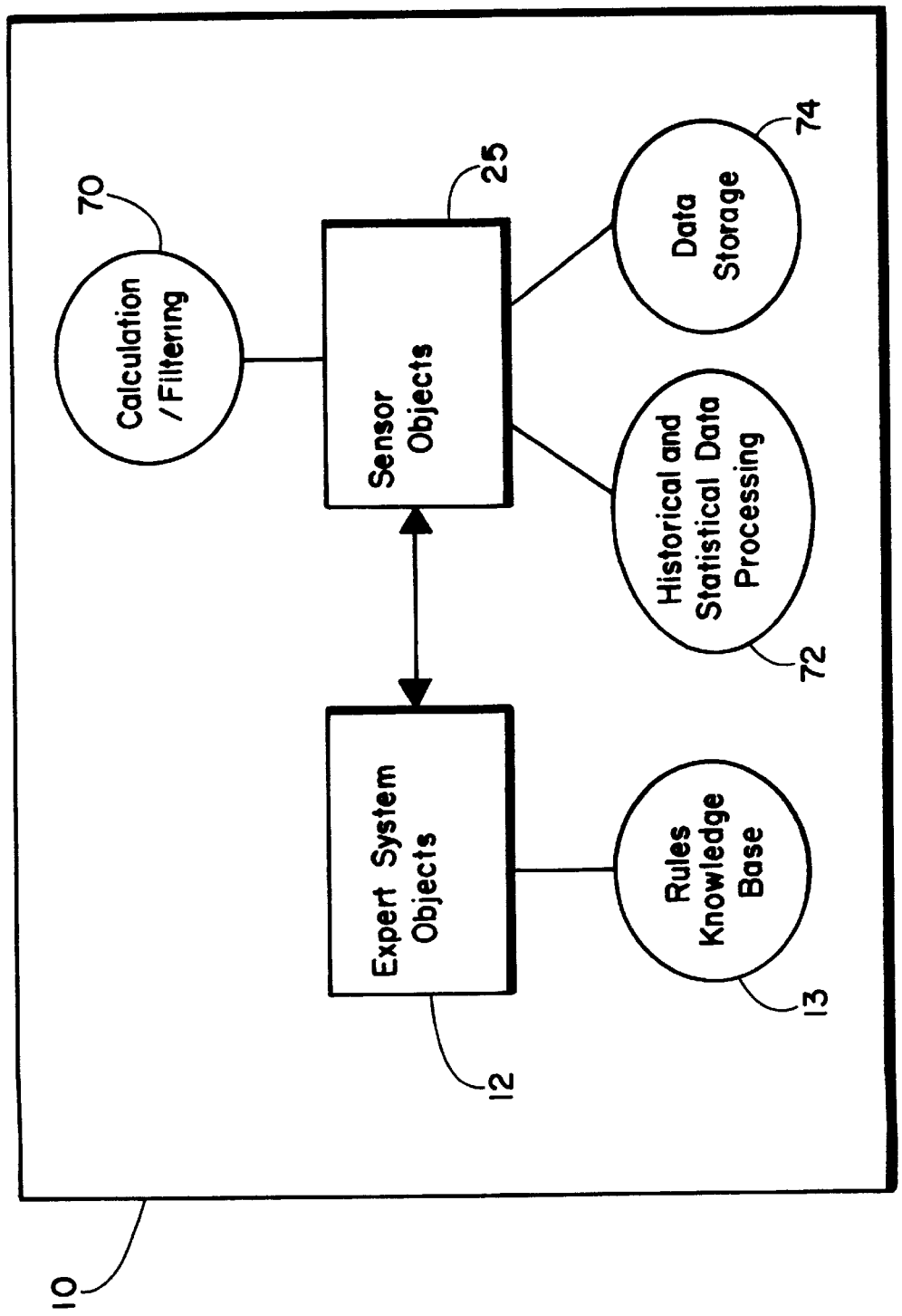
FIG. 17 is a block diagram illustrating how expert system objects and sensor objects interact.

FIG. 17 illustrates how expert system objects 12 and sensor objects 25 interact. Expert system objects 12 can use the rules contained in rules knowledge bases 13 to act on any combination of sensor object's 25 current data in data storage 74 or historical and/or statistical data in historical and statistical data processing 72.

Figure 18:
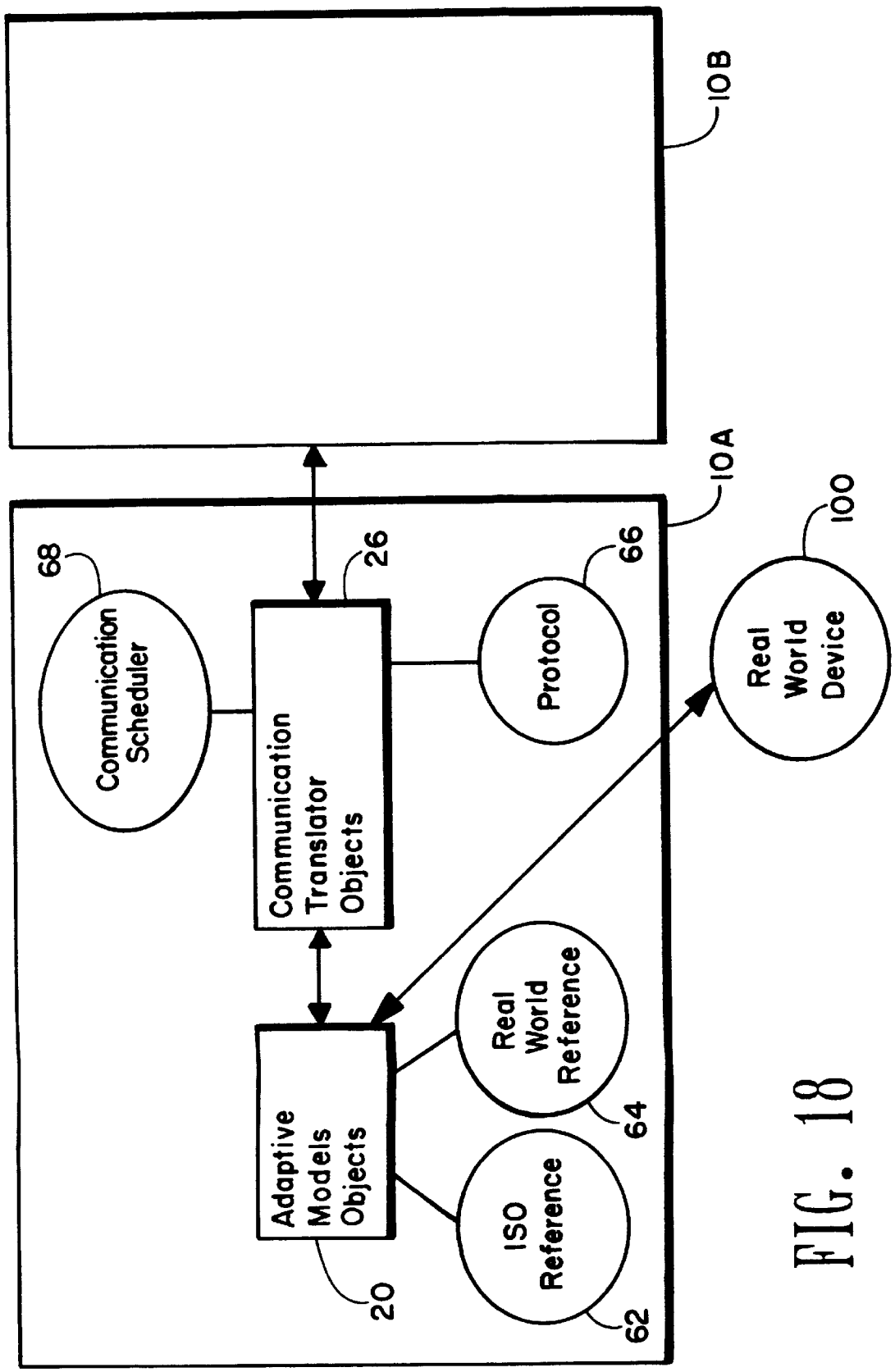
FIG. 18 is a block diagram illustrating how adaptive models objects and communicator translator objects interact.

FIG. 18 illustrates how adaptive models objects 20 and communication translator objects 26 interact. Adaptive models object 20 provides communication translator object 26 with ISO reference 62 or real-world reference 64 identifying ISO 10B or real world device 100 with which ISO 10A wishes to communicate. Communication translator object 26 stores the appropriate reference and schedules requests to retrieve the data from either ISO 10B or real world device 100 as requested, creating the request for data from ISO 10B or real world device 100 using a protocol 66 appropriate to ISO 10B or real world device 100. At the appropriate sampling delta, communication translator object 26 probes ISO 10B or real world device 100, retrieving the data and passing the data to the requesting adaptive models object 20. To transmit data to ISO 10B or real world device 100, adaptive models object 20 passes that data to communication translator object 26 using a transmit-data command; adaptive models object 20 requests data from ISO 10B or real world device 100 by issuing a request-data command. Asynchronous requests to read or write data on demand can be made by adaptive models object 20 when necessary.

Figure 19:
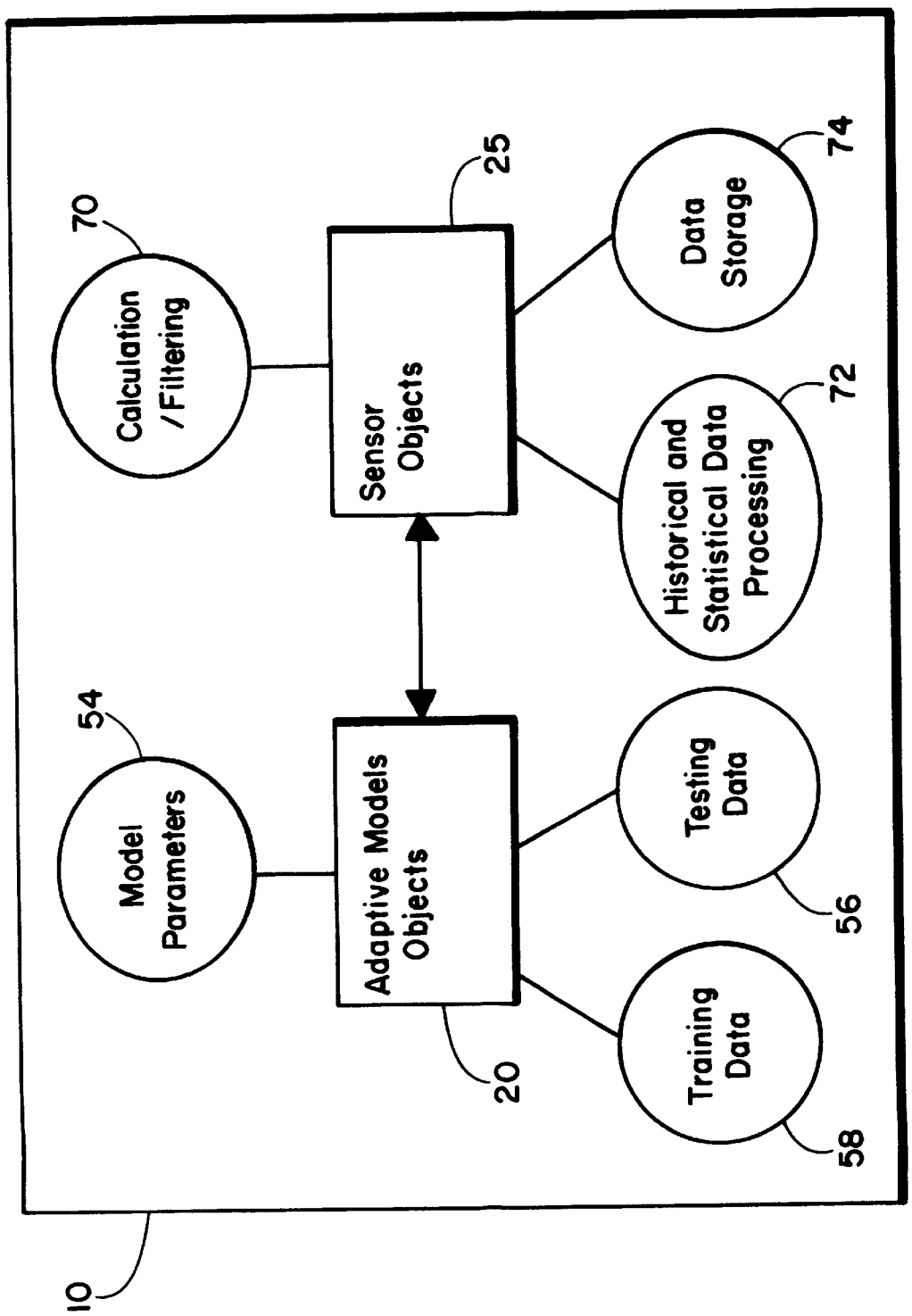
FIG. 19 is a block diagram illustrating how expert adaptive model and sensor objects interact.

FIG. 19 illustrates how adaptive models objects 20 and sensor objects 25 interact. Adaptive models objects 20 provide ISO 10 with the ability to describe, model and predict the process that ISO 10 and its sensor objects 25 represent. Adaptive models objects 20 create the data required to train its adaptive models and to learn how to control its associated process. Adaptive models object 20 stores the data for training in adaptive models object's 20 training data 58; further, adaptive models object 20 creates data required to test the accuracy of what adaptive models object 20 has learned, storing this data in adaptive models object's 20 testing data 56. To create the training data 58 and/or the testing data 56, adaptive models objects 20 consult one or more sensor objects 25 that comprise adaptive models object's 20 list of inputs, said inputs providing the data required to initialize adaptive models object 20 when simulating or predicting the process associated with adaptive models object 20. Adaptive models object 20 also consults one or more sensor objects 25 that comprise adaptive models object's 20 list of outputs, said outputs providing the data that adaptive models object 20 is to describe. An entry in training data 58 or test data 56 includes the inputs from a sampling interval delta together with the corresponding outputs.

Figure 20:
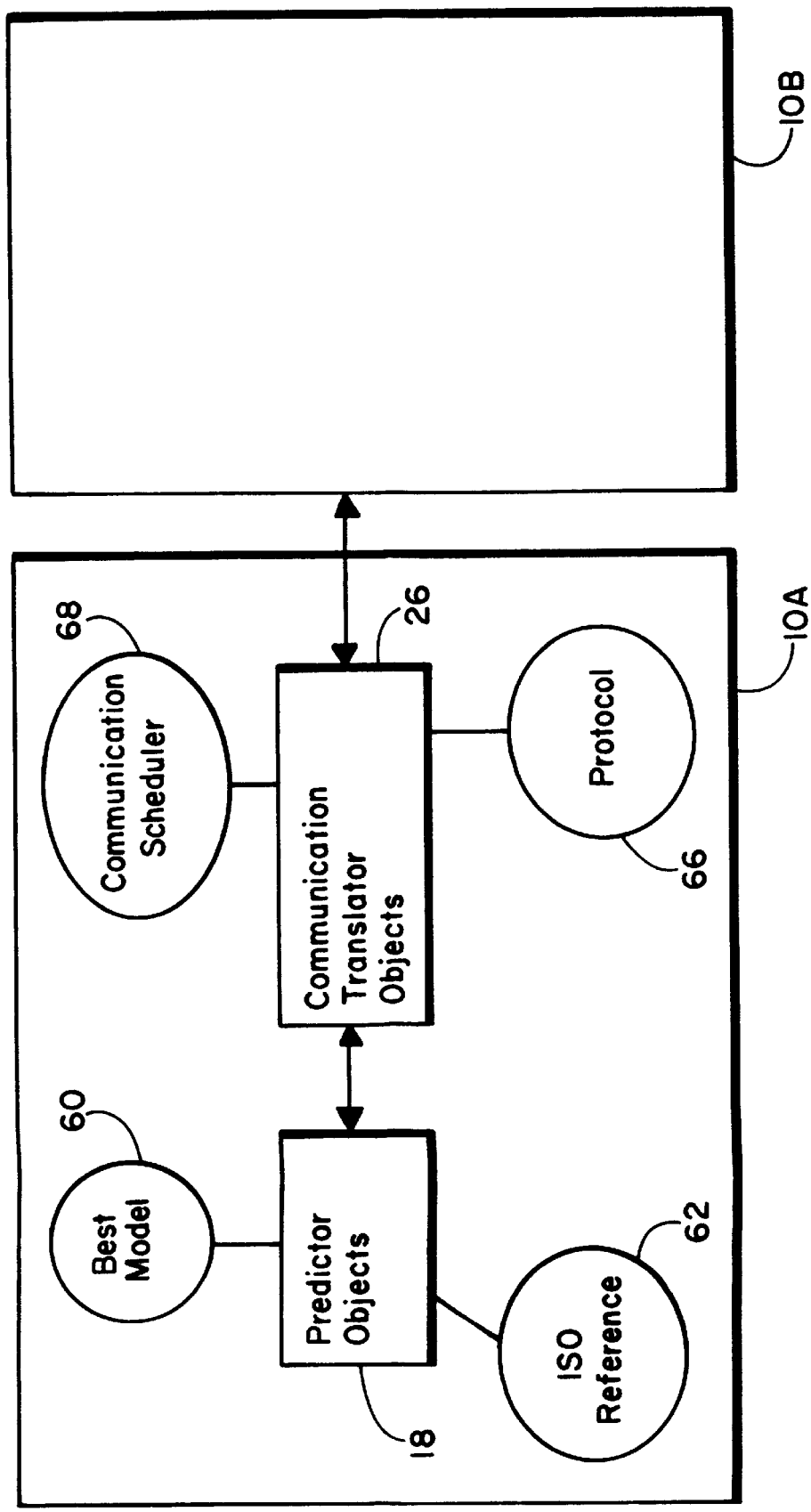
FIG. 20 is a block diagram illustrating how predictor objects and communicator translator objects interact.

FIG. 20 illustrates how predictor objects 18 and communication translator objects 26 interact. Predictor object 18 provides communication translator object 26 with ISO reference 62 identifying ISO 10B with which ISO 10A wishes to communicate. Communication translator object 26 stores ISO reference 62 and schedules requests to retrieve the data from ISO 10B, if necessary, creating the request for data from ISO 10B using a protocol 66 appropriate for ISO 10B of which ISO 10A is aware. At the appropriate sampling delta, communication translator object 26 probes ISO 10B, retrieving the data and passing the data to the requesting predictor object 18. To transmit data to ISO 10B, predictor object 18 passes that data to communication translator object 26 using a transmit-data command; predictor object 18 requests data from ISO 10B by issuing a request-data command. Asynchronous requests to read or write data on demand can be made by predictor object 18 when necessary.

Figure 21:
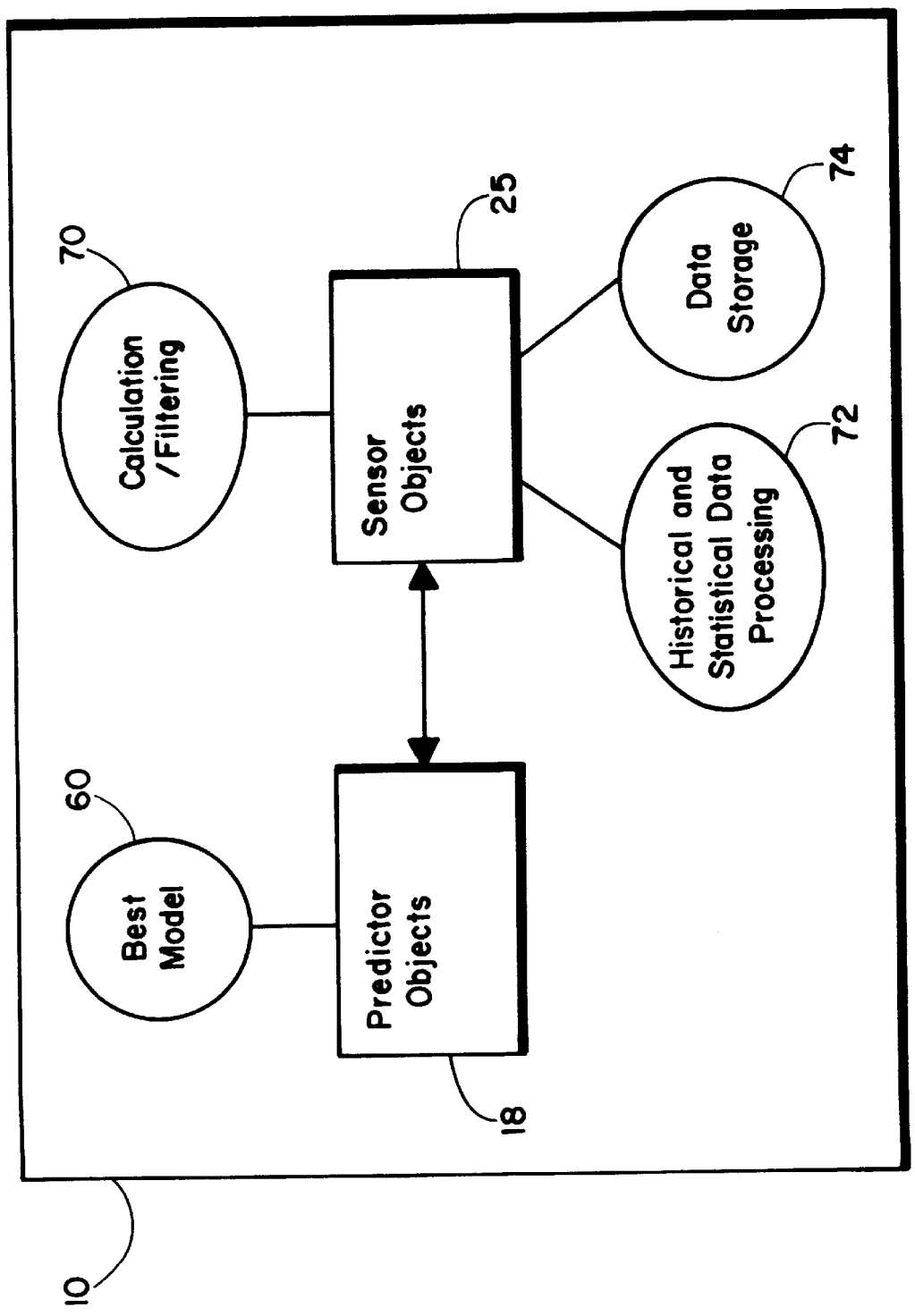
FIG. 21 is a block diagram illustrating how expert predictor and sensor objects interact.

FIG. 21 illustrates how predictor objects 18 and sensor objects 25 interact. Predictor objects 18 provide ISO 10 with adaptive models of the process that ISO 10 represents and those adaptive models' data. Predictor object 18 can be associated with a one or more adaptive models objects 20, and identifies the best model 60 for that sampling delta, i.e. which one of all of the adaptive models objects 20 associated with predictor 18 that is currently predicting most accurately. Predictor object 18 can create sensor objects 25 that store data pertinent to selecting the best model 60 and as well as recording both the current best model's efficiency and predictor object's 18 efficiency. The difference between the current best model's efficiency and predictor object's 18 efficiency is that the current best model's efficiency relates to the performance of that model singularly, but predictor object's 18 efficiency cannot necessarily be attributed to only one model, reflecting and relating instead to the history of predictor object's 18 performance. Predictor object's 18 efficiency thus summarizes the history of each of the models that were selected as the best model 60 of the predictor object 18.

Figure 22:
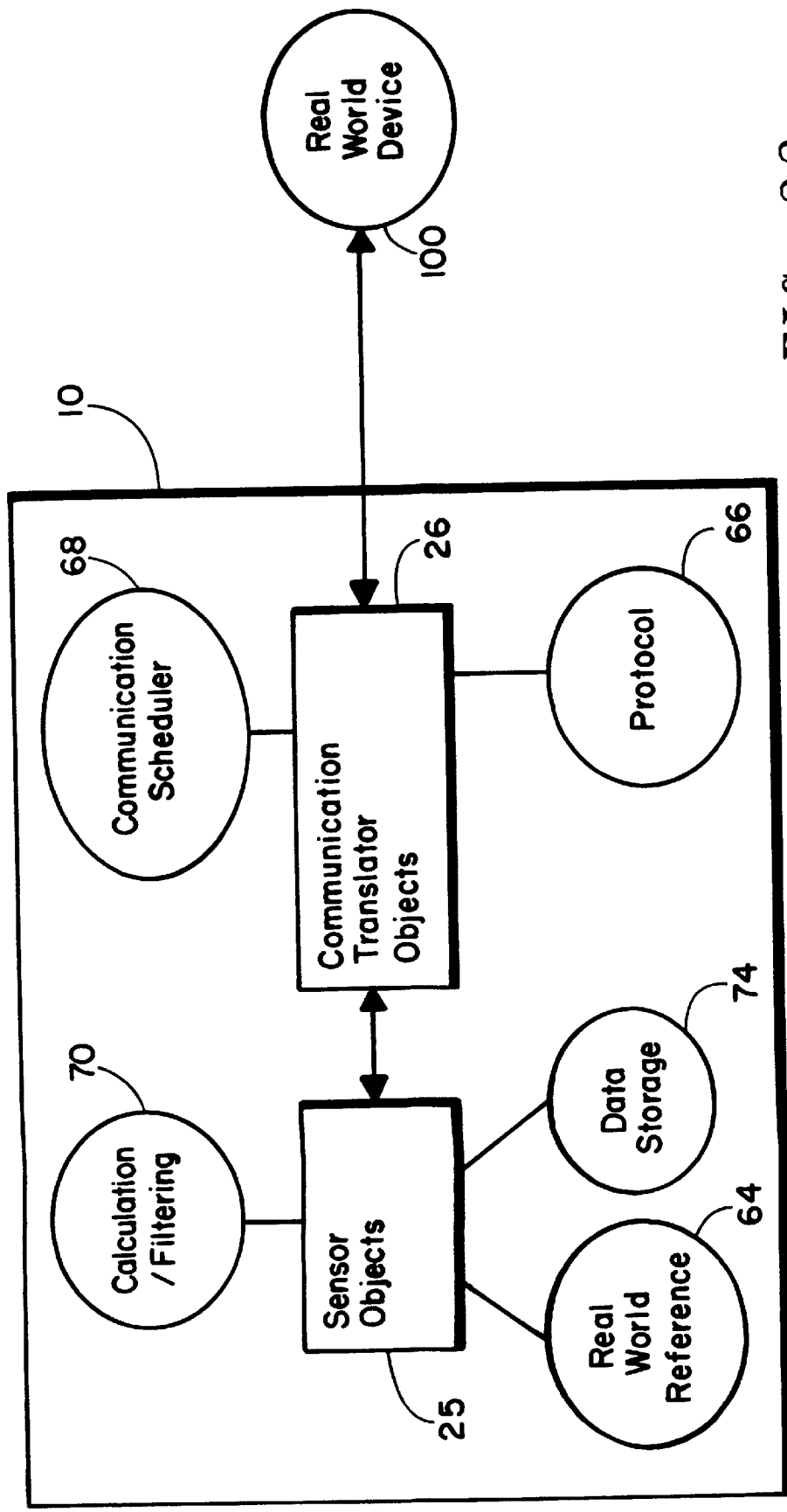
FIG. 22 is a block diagram illustrating how sensor objects and communicator translator objects interact.

FIG. 22 illustrates how sensor objects 25 and communication translator objects 26 interact. Sensor object 25 provides real world reference 64, i.e. the characteristic data required to identify the data in real-world device 100, to communication translator object 26. Communication translator object 26 stores the reference and schedules requests to retrieve the data from real-world device 100, if necessary; communication translator object 26 creates the request for data from real-world device 100 using a protocol 66 for real-world device 100 known to communicator object 26. At the appropriate sampling delta, communication translator object 26 probes real-world device 100, retrieving the data and passing the data to the sensor object 25. When necessary, sensor object 25 can make asynchronous requests to read or write data on demand. To transmit data to real world device 100, sensor object 25 passes the data to be communicated to communication translator object 26 using a transmit-data command. Sensor object 25 requests data from real world device 100 by issuing a request-data command. Whether the data is being requested or transmitted, the sensor object 25 applies the appropriate calculation/filtering 70 methodologies and stores the result in its data storage 74.

The functionality of interconnected ISOs 10 provide control of the real world entities that they represent, model optimize and control. The instant invention provides a user with graphical intuitive user interfaces to initialize and interact with a process control optimization system implemented with the instant invention to achieve ISO 10 interconnection. The instant invention provides a unique ability to allow a user to manipulate the graphical interface and graphically represent the process to be controlled by initializing ISOs 10 and groups of ISOs 10 as well as establishing the manner, order, and priority of information flow between ISOs 10. FIGS. 23 through 27 provide examples of how a user relates to the instant invention through the instant invention's graphical user interface.

Figure 23:
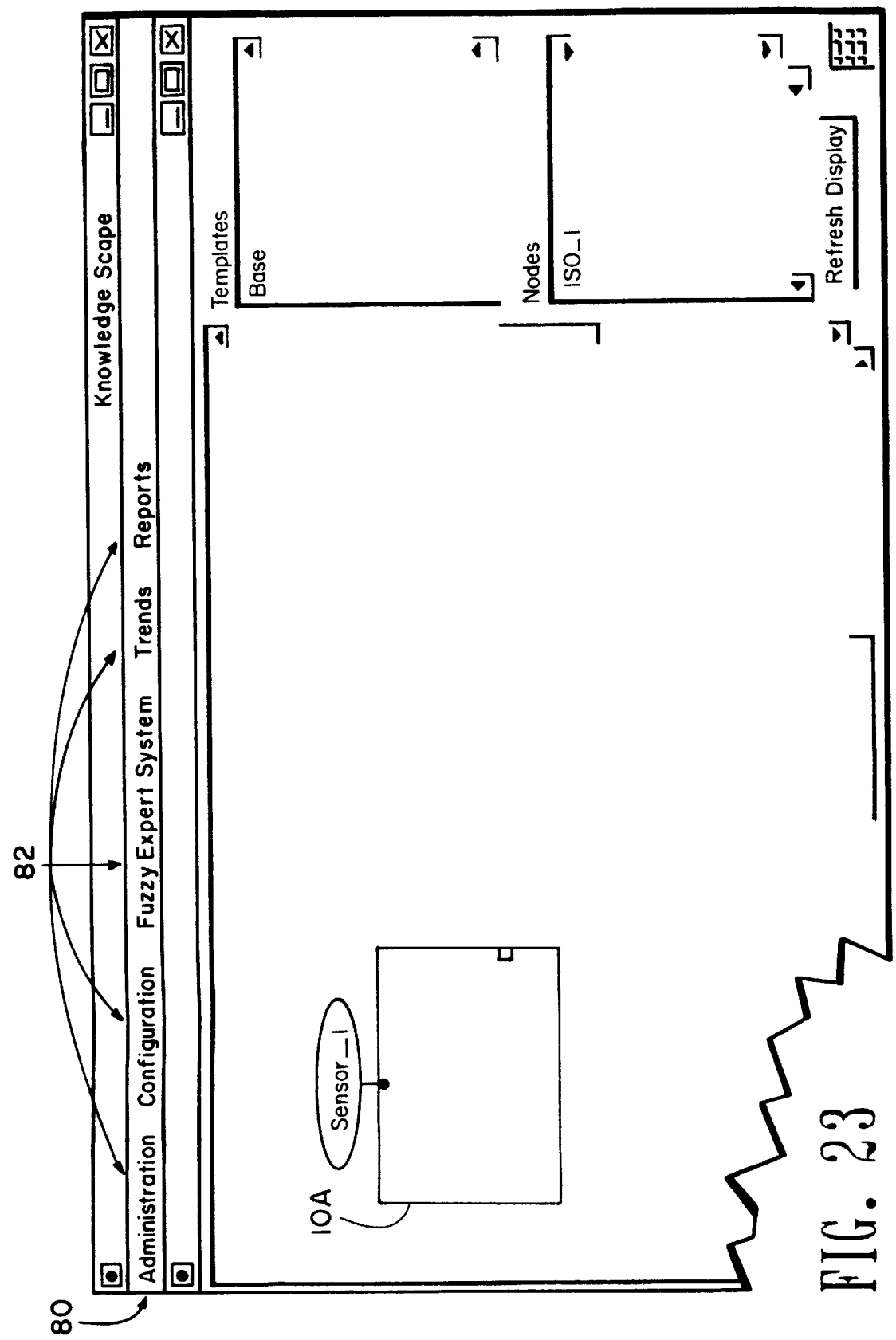
FIG. 23 is a representation of the instant invention's graphical user interface illustrating how a user initializes an ISO.

FIG. 23 illustrates the instant invention's graphical user interface whereby a user configures and initializes ISOs 10. In general, a user selects one or more menu options 82 from menu 80 to add generic ISOs 10 to a configuration drawing; each ISO 10 can have a unique identifier either supplied by the adaptive, optimization software system or by the user. Using menu options 82 from menu 80, a user then can edit the configuration of ISO 10A, including the configuration of that ISO's 10A sensor objects 25, expert system objects 12 rules knowledge bases 13, predictor objects 18, adaptive models objects 20, and optimizer objects 22.

Figure 24:
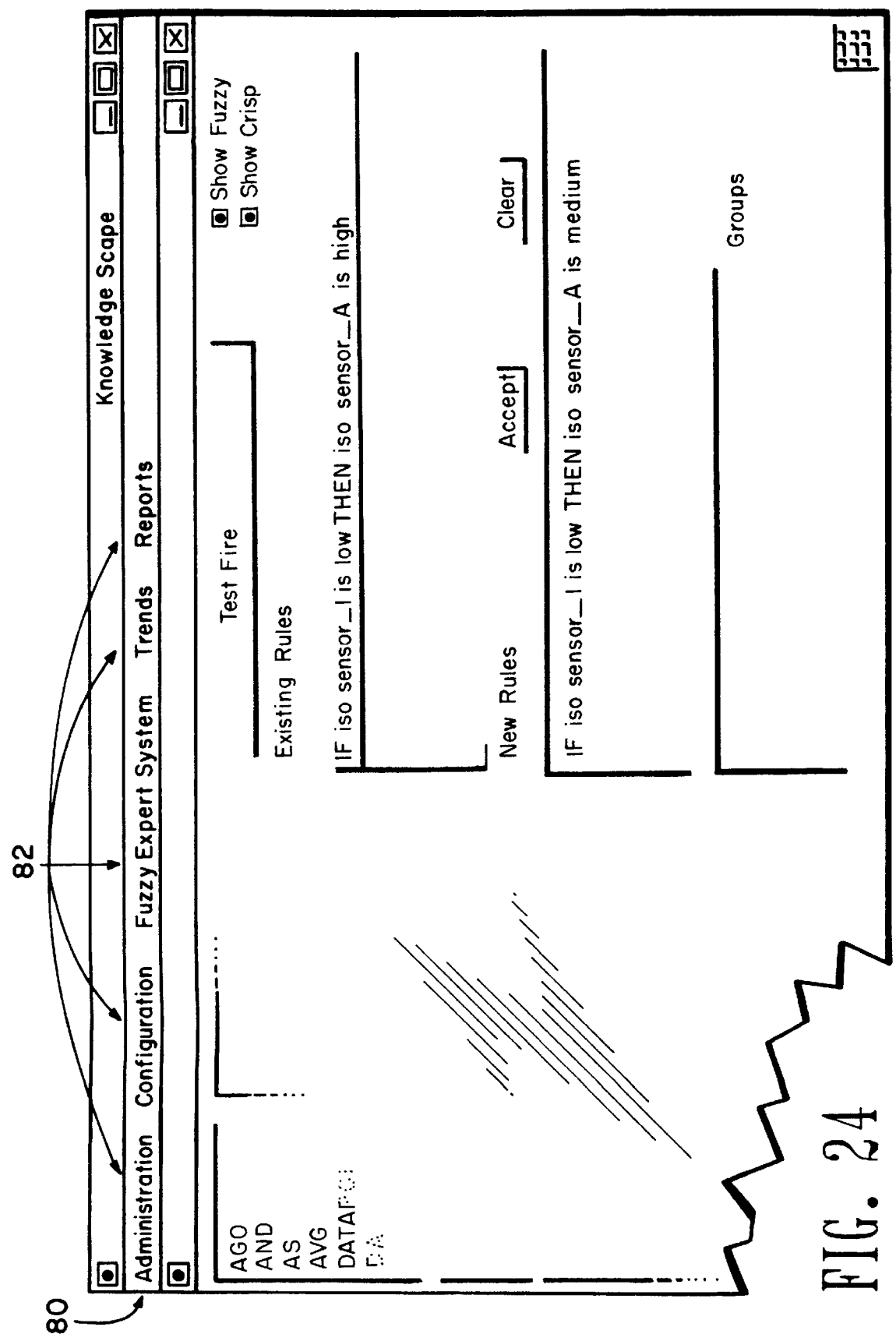
FIG. 24 is a representation of the instant invention's graphical user interface illustrating how a user associates a sensor object with a real-world device.

Although users can configure an ISO 10 when configuring an initial system, FIG. 24 illustrates an example of how a user can use the instant invention's graphical user interface to change ISO's 10 behavior in real-time. In FIG. 24, the graphical user interface is used to select a previously initialized and configured identifiable ISO 10, and further configure a rules knowledge base 13 for an expert system object 12. FIG. 24 illustrates a fuzzy rule 16 previously configured for ISO 10 being changed from:

"IF ISO sensor_1 IS low THEN ISO sensor_A IS high"

to:

"IF ISO sensor_1 IS low THEN ISO sensor_A IS medium"

In similar fashion, a user can use the interface shown in FIG. 24 to change the configuration and behavior of sensor objects 25, predictor objects 18, adaptive models objects 20, and optimizer objects 22.

Figure 25:
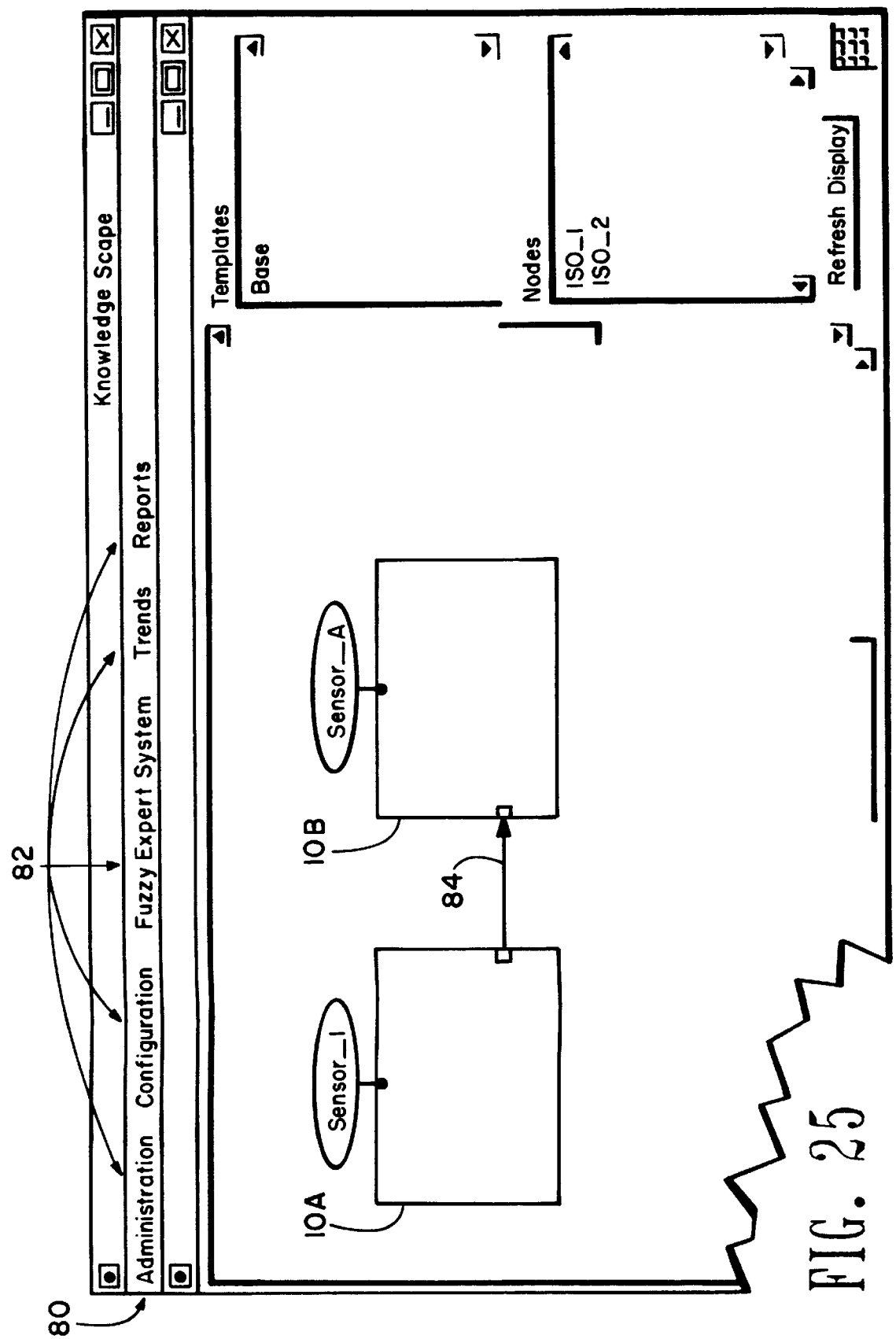
FIG. 25 is a representation of the instant invention's graphical user interface illustrating how a user relates a first ISO to a second ISO through flow connections.

Once a user has configured two or more ISOs 10, users can configure flow and/or hierarchical relationships between ISOs 10. FIG. 25 illustrates the instant invention's graphical user interface as used to associate an ISO 10 by flow connection to another ISO 10. After creating two ISOs 10, ISO 10A and ISO 10B, via the graphical user interface as illustrated in FIG. 23, a user selects menu option 82 from menu 80 that allows a user to draw and configure a flow connection 84 from ISO 10A to ISO 10B. The user then positions a cursor above ISO 10A using a pointing device such as a mouse, and uses the pointing device's selection method to select ISO 10A, e.g. clicks a mouse button. While continuing to select ISO 10A, the user uses the pointing device to position the cursor above ISO 10B and then releases the pointing device's selection method, causing line 84 ending in an arrow point to be added to the drawing depicting the flow relationship. The arrow point indicates the direction of flow, e.g. from ISO 10A to ISO 10B.

Figure 26:
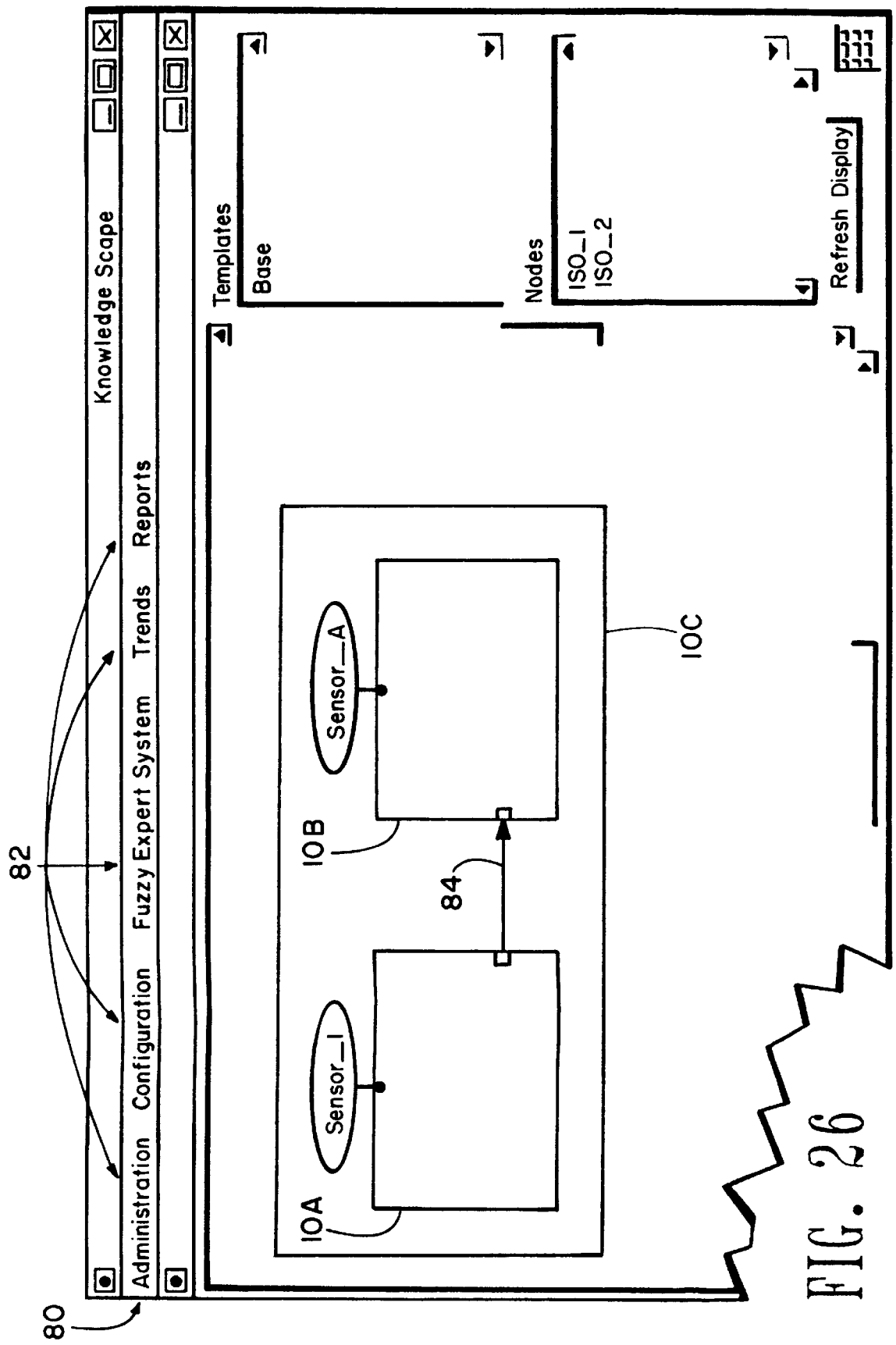
FIG. 26 is a representation of the instant invention's graphical user interface illustrating how a user hierarchically initializes a first ISO and second ISO to a third ISO.

FIG. 26 illustrates the user interface used to hierarchically relate ISO 10A with ISO 10B and with ISO 10C. In this example, a user first creates and configures ISO 10A and ISO 10B as discussed in FIG. 23. In this example, ISO 10A and ISO 10B are further related to each other via a flow connection as described in FIG. 25. The user then selects ISO 10A and ISO 10B by using a pointing device such as a mouse to place a cursor over ISO 10A, selecting ISO 10A with the pointing device's selection ability, e.g. a mouse button, and repeating the selection process for ISO 10B. The user then selects a menu option 82 from menu 80 to create and display ISO 10C; ISO 10C will be one level higher in the hierarchy. ISO 10C will be related to both ISO 10A and ISO 10B by logically encapsulating them as the next highest level in their hierarchy.

Figure 27:
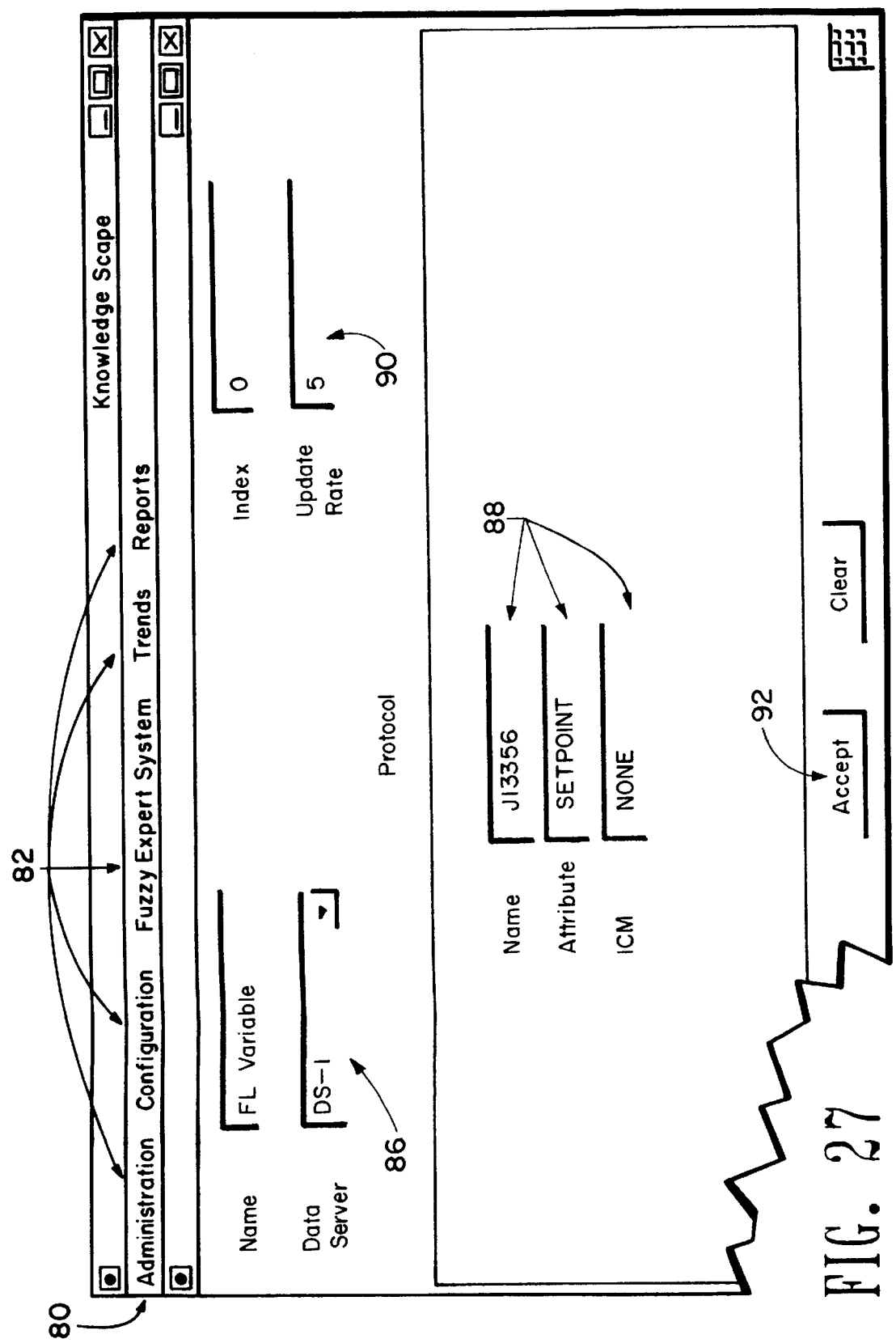
FIG. 27 is a representation of the instant invention's graphical user interface illustrating how a user interfaces with an ISO to change the ISO's behavior in real time.

After ISOs 10 are configured, a user can add sensor objects 25 to ISO 10, optionally relating sensor objects 25 to real world devices. FIG. 27 illustrates the instant invention's graphical user interface being used to associate ISO's 10 sensor object 25 with a real-world device. In this example, a user selects a real-world device in the pull-down combo box labeled "Data Server" 86. Based on the pre-configured protocol(s) for that device, configuration fields 88 appear in the lower section of the display. For the protocol so selected, the user specifies certain attributes of real-world device in configuration fields 88, such as those shown in FIG. 27: "NAME", "ATTRIBUTE" AND "FCM". An update rate for scheduling automatic data retrieval is configured in the type-in box labeled "Update Rate" 90. When the user has properly configured these options, he selects "Accept" button 92.

While preferred embodiments have been shown and described, various modifications and substitutions may be made thereto without departing from the spirit and scope of the invention. Accordingly, it is to be understood that the present invention has been described by way of illustration and not limitations.

INDUSTRIAL APPLICABILITY

As an example of industrial application of the instant invention, a corporation operating a mineral processing plant needing a mineral processing process control system provides insight into the scope of use of the instant invention. For this example, the corporation's mineral processing plant comprises two processing circuits: a grinding process and a the flotation process. The business objectives for operating the mineral processing plant include simultaneously achieving the highest production rate, recovering the highest amount of valuable mineral in the feed rock, producing the highest product quality possible, and conserving raw production material. For this example, it is assumed that the plant layout is such that raw feed materials are processed through the grinding process and then through the flotation process.

Additionally, the corporation's business objectives are somewhat mutually exclusive. For example, increasing the production rate may cause the recovery to decrease, and increasing recovery may lead to lower product quality. Furthermore, conserving raw materials is at odds with maximizing production rate, achieving the highest recovery, and producing the highest product quality. Thus, the economic relationships between incremental changes to production, recovery, product quality and raw materials consumption are complex and difficult to achieve simultaneously.

The adaptive object-oriented software system is used to configure ISOs to represent the mineral processing plant with its grinding and flotation processes. ISOs are positioned on the graphical drawing interface to represent the flow of material and information as well as the hierarchical relationships between ISOs. The level of detail added to the drawing depends on the process being controlled and the control objectives used to optimize the process.

For the example being considered, an ISO representing the mineral processing plant is created or drawn in the drawing, as well as ISOs representing the grinding process and flotation process. These grinding process and flotation process ISOs would be positioned within the mineral processing plant ISO represent the fact that the mineral processing plant is comprised of the grinding and flotation process. ISOs for each processing circuit and equipment associated with the grinding and flotation processes would also be created. All ISOs are then positioned to illustrate the hierarchy and flow of material and information through the plant.

Real world devices representing the instrumentation and data associated with the mineral processing plant, processing circuit and equipment, are associated with appropriate ISOs through sensor objects. Communications translator objects provide for data to be transferred between the real world devices and the adaptive optimization software system. Additionally, sensor objects representing the data defining the objectives of each ISO are configured to facilitate optimization of the process.

Expert system objects' control strategy rules, formulated using fuzzy logic or crisp logic type rules, are configured for ISOs to perform the scope of control appropriate for the ISO. For example, expert system objects' control strategy rules may be configured for the grinding and flotation process to identify periods of operation when the process or equipment is overloaded. Additionally, these rules can be configured to control the processes during periods when adaptive models do not accurately predict process performance.

Predictor objects and adaptive models objects are configured for ISOs to model the processes that the ISOs represent. Adaptive model predictions provide the ISO with the ability to predict future performance, including data defining the performance objectives of the ISOs which they represent.

Optimizer objects and optimizer objects' optimization objectives are configured for ISOs to search for the conditions that will result in the best performance of the process. The chosen conditions may be sent directly to the process or stored in the ISO's sensor objects.

What is claimed is:

1. A goal seeking intelligent software object, useful in process control systems, capable of influencing processes controlled by said process control system through a plurality of encountered states wherein said goal seeking intelligent software object adapts to said controlled process by creating, selecting, learning, training, and remembering one or more predictive software models for each encountered state of said goal seeking intelligent software object whereby for each of said encountered states of said process for which more than one said predictive software model exists, said goal seeking intelligent software object selects one or more of said predictive software models, previously trained, to model said controlled process.

2. A goal seeking intelligent software object comprising a plurality of internal software objects wherein said internal software objects are each in communication with one another, said internal software objects exhibit individualized goal seeking behavior, said internal software objects interact with one another to exhibit aggregate goal seeking behavior, and one or more of said internal software objects may modify said individualized goal seeking behavior of one or more of said other internal software objects.

3. A goal seeking intelligent software object comprising:

a plurality of internal software objects, said plurality of internal software objects further comprising at least one expert system software object, at least one adaptive models software object, at least one predictor software object, and at least one optimizer software object wherein said expert system software object is in communication with said optimizer software object and can modify said optimizer software object's behavior, said expert system software object is in communication with said predictor software object and can modify said predictor software object's behavior, said expert system software object is in communication with said adaptive models software object and can modify said adaptive models software object's behavior, said optimizer software object is in communication with said expert system software object and can modify said expert system software object's behavior, said optimizer software object is in communication with said predictor software object and can modify said predictor software object's behavior, and said optimizer software object is in communication with said adaptive models software object and can modify said adaptive models software object's behavior whereby said plurality of internal software objects exhibit aggregate goal seeking behavior.

4. The goal seeking intelligent software object as described in claim 3 wherein said expert system software object further comprises a rules knowledge base comprising one or more rules selected from a set of crisp logic rules and fuzzy logic rules.

5. The goal seeking intelligent software object as described in claim 3 wherein said optimizer software object further comprises optimization methodologies wherein said optimization methodologies include one or more genetic algorithms.

6. The goal seeking intelligent software object as described in claim 3 further comprising modeling methodologies wherein said modeling methodologies include one or more neural networks.

7. The goal seeking intelligent software object as described in claim 3 wherein said communication translator software object further comprises communications protocols selected from a set comprising internal protocols, protocols required by devices external to said goal seeking intelligent software object, serial data communication protocols, parallel data communication protocols, local area network data communication protocols, and wide area data communication protocols.

8. A goal seeking intelligent software object which comprises:
at least one expert system software object comprising at least one rules knowledge base;
at least one adaptive models software object generating one or more predictive models from one or more input values and from one or more modeling methodologies;
at least one predictor software object selecting an optimal one of said predictive models using predictor selection criteria and optimizing methodologies;
at least one optimizer software object setting optimal output data values for said optimizer software object utilizing one or more objective goals and one or more optimization methodologies;
at least one communication translator software object communicating data using one or more data communications protocols; and
at least one sensor software object which may accept data from said expert system software objects, said optimizer software objects, said adaptive models software objects, said predictor software objects, said communication translator software objects, and other sensor software objects; process said data for storage; store said data; and provide stored data on request by said expert system software objects, said optimizer software objects, said adaptive models software objects, said predictor software objects, said communication translator software objects, and other sensor software objects to said expert system software objects, said optimizer software objects, said adaptive models software objects, said predictor software objects, and said communication translator software objects; whereby
said expert system software object is in communication with said optimizer software object and can modify said optimizer software object said objective goals,
said expert system software object is in communication with said optimizer software object and can modify said optimization methodologies,
said expert system software object is in communication with said predictor software object and can modify said predictor selection criteria of said predictor software object,
said expert system software object is in communication with said adaptive models software object and can modify said modeling methodologies of said adaptive models software object,
said optimizer software object is in communication with said expert system software object and can modify said rules knowledge base of said expert system software object,
said optimizer software object is in communication with said predictor software object and can modify said selection criteria of said predictor software object, and
said optimizer software object is in communication with said adaptive models software object and can modify said modeling methodologies of said adaptive models software object.

9. A goal seeking intelligent software object as in claim 8 further comprising a plurality of said sensor software objects, each said sensor software object additionally able to provide said stored data on request by another of said sensor software objects.

10. An adaptive optimization software system comprising:
a plurality of goal seeking intelligent software objects, useful in process control systems, capable of influencing processes controlled by said process control system through a plurality of encountered states wherein
said goal seeking intelligent software objects adapt to said controlled process by creating, selecting, learning, training, and remembering one or more predictive software models for each encountered state of said goal seeking intelligent software objects whereby
for each of said encountered states of said process for which more than one said predictive software model exists, said goal seeking intelligent software objects select predictive software models, previously trained, to model said controlled process,
said plurality of said goal seeking intelligent software objects relationally communicate with other of said goal seeking intelligent software objects, and
said goal seeking intelligent software objects may each communicate with devices external to any of said goal seeking intelligent software objects.

11. An adaptive optimization software system as described in claim 10 further comprising a graphical user interface wherein said graphical user interface is used to define said relational communication from a set of relational communications consisting of a user defined number of hierarchical relationships and flow relationships, whereby
said hierarchical relationships define prioritization and scope relationships between a plurality of said goal seeking intelligent software objects, and
said flow relationships representationally correspond to data communicated between said plurality of said goal seeking intelligent software objects.

12. An adaptive optimization software system as described in claim 11 wherein said prioritization and scope of said goal seeking intelligent software object at the highest hierarchical relationship level are economics based.

13. An adaptive optimization software system as described in claim 11 wherein said prioritization and scope of said goal seeking intelligent software object at the lowest hierarchical relationship level are non-economics based.

14. A process control optimization system comprising:
a computer system further comprising
one or more display devices comprising one or more display areas, and end user input devices;
a controllable process further comprising
external devices further comprising
one or more controllable devices wherein
said controllable devices provide interfaces which provide communication means between said computer system and said controllable devices; and
instrumentation providing data; and
one or more optimization goals for said process control system; and
an adaptive optimization software system further comprising a plurality of goal seeking intelligent software objects capable of influencing said controllable process wherein said goal seeking intelligent software objects further
comprise
one or more rules knowledge databases,
one or more modeling methodologies,
one or more predictor selection criteria, and
one or more optimal objective goals;
said goal seeking intelligent software objects adapt to
said controllable process by creating, selecting,
learning, training, and remembering one or more
predictive software models for each encountered
state of said goal seeking intelligent software
objects; and
one or more said goal seeking intelligent software
objects are in communication with one or more of
said external devices whereby
for each of said encountered states of said controllable process for which more than one said predictive model exists, said goal seeking intelligent
software objects select predictive software
models, previously trained, to model said controllable process wherein
one or more of said rules knowledge databases
comprises rules to implement said optimization goals for said controllable process,
one or more of said modeling methodologies
generate models of said controllable process,
one or more of said predictor selection criteria
exemplify said optimization goals for said controllable process, and
one or more of said optimization goals for said
controllable process include optimization of
said process control system;
said plurality of said goal seeking intelligent software objects relationally communicate with other
of said goal seeking intelligent software objects;
and
each of said goal seeking intelligent software objects
in communication with one of said external
devices representationally corresponds to that said
external device.

15. A process control optimization system as described in claim 14 wherein said instrumentation providing data provides actual real-world device data.

16. A process control optimization system as described in claim 14 wherein said instrumentation providing data provides simulated real-world device data.

17. A process control optimization system as described in claim 14 further comprising a graphical user interface wherein said graphical user interface is used to define any number of said relational communications from a set of relational communications consisting of hierarchical relationships and flow relationships, whereby
said hierarchical relationships define prioritization and
scope relationships between said goal seeking intelligent software objects,
said flow relationships representationally correspond to
the process which is to be controlled by said goal
seeking intelligent software objects, and
said flow relationships further representationally correspond to data communicated between said goal seeking
intelligent software objects.

18. A method of adaptive optimization of a process controlled optimization system wherein said process control optimization system provides a plurality of goal seeking intelligent software objects further comprising sensor software objects providing current data, historical data, and statistical data; expert system software objects providing one or more associated rules knowledge bases; adaptive models software objects providing one or more modeling methodologies; predictor software objects providing one or more predictor selection criteria; optimizer software objects providing one or more goals and objective functions, and process constraints; and communications translator software objects providing one or more data communications protocols for a given sampling delta, comprising the concurrent steps of:
conducting a process which is controlled by said process
controlled optimization system;
determining, within said optimizer software objects, optimal output data values which best achieve said goals
and objective functions without violating said process
constraints;
examining, within said expert system software objects,
said best fit predictive models that achieve said goals
and objective functions without violating said process
constraints; and
determining, within said expert system software objects,
appropriate adaptive interventions.

19. A method of adaptive optimization of a process controlled optimization system as in claim 18 wherein said process control optimization system is used to simulate a real-world process useful for training end users.

20. A method of adaptive optimization of a process controlled optimization system as in claim 18 wherein said determining optimal output data values step further comprises the steps of
providing said optimizer software objects with one or
more input values and with said current data, historical
data, and statistical data,
determining, within said optimizer software objects, trial
values which best achieve said goals and objective-
..functions without violating said process constraints,
evaluating, within said optimizer software objects, said
trial values, said evaluating step further comprising the
steps of
determining, within said predictor software objects,
best fit predictive models, said best fit predictive
models most closely matching said output data values;
simulating, calculating, and predicting, within said
adaptive models software objects associated with
said optimizer software objects, future performance
of said process which is controlled using said trial
values and said best file predictive model;
determining, within said optimizer software objects,
whether said best fit predictive models achieve said
goals and objective functions without violating said
process constraints;
retaining, within said optimizer software objects, said
trial values if said best fit predictive models achieve
said goals and objective functions without violating
said process constraints; and attempting, within said optimizer software objects, a new set of trial values if said best fit predictive models do not achieve said goals and objective functions without violating said process constraints.

21. A method of adaptive optimization of a process controlled optimization system as in claim 18 wherein said determining appropriate adaptive interventions step further comprises the steps of utilizing, within said expert system software objects, one or more of said rules knowledge bases to adaptively modify performance goals for said optimizer software objects;

utilizing, within said expert system software objects, one or more of said rules knowledge bases to adaptively modify said optimizer software objects' configuration;

utilizing, within said expert system software objects, one or more of said rules knowledge bases to adaptively modify performance goals for said adaptive models software objects;

utilizing, within said expert system software objects, one or more said rules knowledge bases to adaptively modify said adaptive models software objects' configuration;

utilizing, within said expert system software objects, one or more of said rules knowledge bases to adaptively modify performance goals for said predictor software objects; and utilizing, within said expert system software objects, one or more of said rules knowledge bases to adaptively modify said predictor software objects' configuration.

* * * * *